(12) United States Patent
Samuels et al.

(10) Patent No.: US 7,969,876 B2
(45) Date of Patent: *Jun. 28, 2011

(54) METHOD OF DETERMINING PATH MAXIMUM TRANSMISSION UNIT

(75) Inventors: Allen Samuels, San Jose, CA (US); Paul Sutter, San Francisco, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 33 days.

This patent is subject to a terminal disclaimer.

(21) Appl. No.: 12/429,774

(22) Filed: Apr. 24, 2009

(65) Prior Publication Data

US 2009/0201828 A1 Aug. 13, 2009

Related U.S. Application Data

(63) Continuation of application No. 10/696,507, filed on Oct. 29, 2003, now Pat. No. 7,542,471.

(60) Provisional application No. 60/422,801, filed on Oct. 30, 2002.

(51) Int. Cl.
*H04L 12/26* (2006.01)

(52) U.S. Cl. .................. 370/230; 370/241; 370/395.21; 370/401

(58) Field of Classification Search .................. None
See application file for complete search history.

(56) References Cited

U.S. PATENT DOCUMENTS

| | | | |
|---|---|---|---|
| 4,438,511 A | 3/1984 | Baran | |
| 4,701,745 A | 10/1987 | Waterworth et al. | |
| 4,736,369 A | 4/1988 | Barzilai et al. | |
| 4,750,171 A | 6/1988 | Kedar et al. | |
| 4,768,190 A | 8/1988 | Giancarlo | |
| 4,893,307 A | 1/1990 | McKay et al. | |
| 4,928,247 A | 5/1990 | Doyle et al. | |
| 4,941,089 A | 7/1990 | Fischer | |
| 4,953,159 A | 8/1990 | Hayden et al. | |

(Continued)

FOREIGN PATENT DOCUMENTS

WO WO-9966675 12/1999

OTHER PUBLICATIONS

Mogul, Jeffrey and Deering, Steve, "Path MTU Discovery", RFC 1191, Nov. 1990.*

(Continued)

*Primary Examiner* — Chirag G Shah
*Assistant Examiner* — Salvador E Rivas
(74) *Attorney, Agent, or Firm* — Foley & Lardner LLP; Christopher McKenna

(57) ABSTRACT

Network endpoints using TCP/IP operate to determine the maximum transmission unit (MTU) of the path between them. This determination is done so as to avoid the expensive IP fragmentation that will occur when transmitting links with a smaller MTU size. The standard method of determining the path MTU (PMTU) has several known deficiencies, including: inefficient use of bandwidth as proper operation will likely result in the loss of one or more packets and difficulty of implementation as the reverse channel communication mechanism, reception of ICMP messages indicating the discarding of unfragmentable packets, is frequently blocked by firewalls and other security apparatus.

A method of determining the PMTU between intermediate proxies is disclosed that does not require reception of ICMP messages or the inefficient use of bandwidth due to the presumed dropping of packets with valid data.

20 Claims, 4 Drawing Sheets

U.S. PATENT DOCUMENTS

| | | |
|---|---|---|
| 5,014,221 A | 5/1991 | Mogul |
| 5,021,949 A | 6/1991 | Morten et al. |
| 5,029,164 A | 7/1991 | Goldstein et al. |
| 5,181,200 A | 1/1993 | Harrison |
| 5,241,625 A | 8/1993 | Epard et al. |
| 5,307,456 A | 4/1994 | MacKay |
| 5,315,698 A | 5/1994 | Case et al. |
| 5,392,223 A | 2/1995 | Caci |
| 5,446,736 A | 8/1995 | Gleeson et al. |
| 5,541,927 A | 7/1996 | Kristol et al. |
| 5,564,070 A | 10/1996 | Want et al. |
| 5,572,674 A | 11/1996 | Ernst |
| 5,623,603 A | 4/1997 | Jiang et al. |
| 5,757,795 A | 5/1998 | Schnell |
| 5,758,085 A | 5/1998 | Kouoheris et al. |
| 5,764,915 A | 6/1998 | Heimsoth et al. |
| 5,793,768 A | 8/1998 | Keshav |
| 5,809,235 A | 9/1998 | Sharma et al. |
| 5,822,543 A | 10/1998 | Dunn et al. |
| 5,838,920 A | 11/1998 | Rosborough |
| 5,864,678 A | 1/1999 | Riddle |
| 5,936,940 A | 8/1999 | Marin et al. |
| 5,938,733 A | 8/1999 | Heimsoth et al. |
| 5,959,974 A | 9/1999 | Badt et al. |
| 5,974,028 A | 10/1999 | Ramakrishnan |
| 6,003,030 A | 12/1999 | Kenner et al. |
| 6,005,843 A | 12/1999 | Kamiya et al. |
| 6,076,113 A | 6/2000 | Ramanathan et al. |
| 6,078,582 A | 6/2000 | Curry et al. |
| 6,108,697 A | 8/2000 | Raymond et al. |
| 6,112,085 A | 8/2000 | Garner et al. |
| 6,170,075 B1 | 1/2001 | Schuster et al. |
| 6,181,711 B1 | 1/2001 | Zhang et al. |
| 6,198,920 B1 | 3/2001 | Doviak et al. |
| 6,252,851 B1 | 6/2001 | Siu et al. |
| 6,256,673 B1 | 7/2001 | Gayman |
| 6,259,705 B1 | 7/2001 | Takahashi et al. |
| 6,282,172 B1 | 8/2001 | Robles et al. |
| 6,289,382 B1 | 9/2001 | Bowman-Amuah |
| 6,332,163 B1 | 12/2001 | Bowman-Amuah |
| 6,333,931 B1 | 12/2001 | LaPier et al. |
| 6,339,832 B1 | 1/2002 | Bowman-Amuah |
| 6,359,882 B1 | 3/2002 | Robles et al. |
| 6,374,300 B2 | 4/2002 | Masters |
| 6,397,259 B1 | 5/2002 | Lincke et al. |
| 6,400,996 B1 | 6/2002 | Hoffberg et al. |
| 6,405,252 B1 | 6/2002 | Gupta et al. |
| 6,418,324 B1 | 7/2002 | Doviak et al. |
| 6,421,726 B1 | 7/2002 | Kenner et al. |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,748 B1 | 8/2002 | Bowman-Amuah |
| 6,452,915 B1 | 9/2002 | Jorgensen |
| 6,463,470 B1 | 10/2002 | Mohaban et al. |
| 6,466,984 B1 | 10/2002 | Naveh et al. |
| 6,473,794 B1 | 10/2002 | Guheen et al. |
| 6,473,802 B2 | 10/2002 | Masters |
| 6,477,580 B1 | 11/2002 | Bowman-Amuah |
| 6,477,665 B1 | 11/2002 | Bowman-Amuah |
| 6,496,481 B1 | 12/2002 | Wu et al. |
| 6,496,520 B1 | 12/2002 | Acosta |
| 6,496,850 B1 | 12/2002 | Bowman-Amuah |
| 6,496,856 B1 | 12/2002 | Kenner et al. |
| 6,502,125 B1 | 12/2002 | Kenner et al. |
| 6,502,135 B1 | 12/2002 | Munger et al. |
| 6,502,213 B1 | 12/2002 | Bowman-Amuah |
| 6,519,571 B1 | 2/2003 | Guheen et al. |
| 6,523,027 B1 | 2/2003 | Underwood |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,539,396 B1 | 3/2003 | Bowman-Amuah |
| 6,546,425 B1 | 4/2003 | Hanson et al. |
| 6,549,949 B1 | 4/2003 | Bowman-Amuah |
| 6,550,057 B1 | 4/2003 | Bowman-Amuah |
| 6,571,282 B1 | 5/2003 | Bowman-Amuah |
| 6,573,907 B1 | 6/2003 | Madrane et al. |
| 6,578,068 B1 | 6/2003 | Bowman-Amuah |
| 6,584,569 B2 | 6/2003 | Reshef et al. |
| 6,590,588 B2 | 7/2003 | Lincke et al. |
| 6,601,107 B1 | 7/2003 | Seibert |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,606,660 B1 | 8/2003 | Bowman-Amuah |
| 6,606,744 B1 | 8/2003 | Mikurak |
| 6,609,128 B1 | 8/2003 | Underwood |
| 6,611,522 B1 | 8/2003 | Zheng et al. |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,618,761 B2 | 9/2003 | Munger et al. |
| 6,622,172 B1 | 9/2003 | Tam et al. |
| 6,624,766 B1 | 9/2003 | Possley et al. |
| 6,633,878 B1 | 10/2003 | Underwood |
| 6,636,242 B2 | 10/2003 | Bowman-Amuah |
| 6,640,238 B1 | 10/2003 | Bowman-Amuah |
| 6,640,244 B1 | 10/2003 | Bowman-Amuah |
| 6,640,248 B1 | 10/2003 | Jorgensen |
| 6,640,249 B1 | 10/2003 | Bowman-Amuah |
| 6,657,954 B1 | 12/2003 | Bird et al. |
| 6,658,021 B1 | 12/2003 | Bromley et al. |
| 6,665,706 B2 | 12/2003 | Kenner et al. |
| 6,671,818 B1 | 12/2003 | Mikurak |
| 6,683,873 B1 | 1/2004 | Kwok et al. |
| 6,687,227 B1 | 2/2004 | Li et al. |
| 6,687,732 B1 | 2/2004 | Bector et al. |
| 6,697,368 B2 | 2/2004 | Chang et al. |
| 6,704,873 B1 | 3/2004 | Underwood |
| 6,711,166 B1 | 3/2004 | Amir et al. |
| 6,714,536 B1 | 3/2004 | Dowling |
| 6,715,145 B1 | 3/2004 | Bowman-Amuah |
| 6,718,380 B1 | 4/2004 | Mohaban et al. |
| 6,718,535 B1 | 4/2004 | Underwood |
| 6,721,713 B1 | 4/2004 | Guheen et al. |
| 6,735,218 B2 | 5/2004 | Chang et al. |
| 6,742,015 B1 | 5/2004 | Bowman-Amuah |
| 6,745,360 B1 | 6/2004 | Srinivas et al. |
| 6,792,615 B1 | 9/2004 | Rowe et al. |
| 6,799,221 B1 | 9/2004 | Kenner et al. |
| 6,801,499 B1 | 10/2004 | Anandakumar et al. |
| 6,816,963 B1 | 11/2004 | Krithivas et al. |
| 6,820,133 B1 * | 11/2004 | Grove et al. .............. 709/238 |
| 6,826,616 B2 | 11/2004 | Larson et al. |
| 6,834,297 B1 | 12/2004 | Peiffer et al. |
| 6,834,310 B2 | 12/2004 | Munger et al. |
| 6,839,759 B2 | 1/2005 | Larson et al. |
| 6,842,906 B1 | 1/2005 | Bowman-Amuah |
| 6,847,892 B2 | 1/2005 | Zhou et al. |
| 6,850,252 B1 | 2/2005 | Hoffberg |
| 6,850,491 B1 | 2/2005 | Firoiu et al. |
| 6,856,651 B2 | 2/2005 | Singh |
| 6,877,043 B2 | 4/2005 | Mallory et al. |
| 6,882,624 B2 | 4/2005 | Ma et al. |
| 6,882,634 B2 | 4/2005 | Bagchi et al. |
| 6,888,844 B2 | 5/2005 | Mallory et al. |
| 6,891,881 B2 | 5/2005 | Trachewsky et al. |
| 6,898,204 B2 | 5/2005 | Trachewsky et al. |
| 6,901,072 B1 | 5/2005 | Wong |
| 6,901,075 B1 | 5/2005 | Baron |
| 6,907,473 B2 | 6/2005 | Schmidt et al. |
| 6,914,886 B2 | 7/2005 | Peles et al. |
| 6,928,473 B1 | 8/2005 | Sundaram et al. |
| 6,934,288 B2 | 8/2005 | Dempo et al. |
| 6,954,800 B2 | 10/2005 | Mallory |
| 6,957,186 B1 | 10/2005 | Guheen et al. |
| 6,973,097 B1 | 12/2005 | Donzis et al. |
| 6,975,655 B2 | 12/2005 | Fischer et al. |
| 6,980,543 B1 | 12/2005 | Kastenholz et al. |
| 6,981,047 B2 | 12/2005 | Hanson et al. |
| 6,981,087 B1 | 12/2005 | Heitkamp et al. |
| 6,982,963 B2 | 1/2006 | Asahina et al. |
| 6,988,236 B2 | 1/2006 | Ptasinski et al. |
| 6,990,070 B1 | 1/2006 | Aweya et al. |
| 6,993,101 B2 | 1/2006 | Trachewsky et al. |
| 7,000,031 B2 | 2/2006 | Fischer et al. |

| | | |
|---|---|---|
| 7,003,777 B2 | 2/2006 | Hines |
| 7,007,089 B2 | 2/2006 | Freedman |
| 7,016,367 B1 | 3/2006 | Dyckerhoff et al. |
| 7,020,719 B1 | 3/2006 | Grove et al. |
| 7,023,979 B1 | 4/2006 | Wu et al. |
| 7,028,083 B2 | 4/2006 | Levine et al. |
| 7,031,315 B2 | 4/2006 | Tanaka et al. |
| 7,035,285 B2 | 4/2006 | Holloway et al. |
| 7,062,645 B2 | 6/2006 | Kroening |
| 7,100,195 B1 | 8/2006 | Underwood |
| 7,103,068 B1 | 9/2006 | Gardner et al. |
| 7,116,894 B1 | 10/2006 | Chatterton |
| 7,124,101 B1 | 10/2006 | Mikurak |
| 7,130,807 B1 | 10/2006 | Mikurak |
| 7,136,645 B2 | 11/2006 | Hanson et al. |
| 7,149,698 B2 | 12/2006 | Guheen et al. |
| 7,150,017 B1 | 12/2006 | Vogl et al. |
| 7,165,041 B1 | 1/2007 | Guheen et al. |
| 7,171,440 B2 | 1/2007 | Hanner |
| 7,174,126 B2 | 2/2007 | McElhatten et al. |
| 7,188,180 B2 | 3/2007 | Larson et al. |
| 7,197,234 B1 | 3/2007 | Chatterton |
| 7,197,751 B2 | 3/2007 | Fedotov et al. |
| 7,206,805 B1 | 4/2007 | McLaughlin, Jr. |
| 7,206,811 B2 | 4/2007 | Skurikhin et al. |
| 7,209,437 B1 | 4/2007 | Hodgkinson et al. |
| 7,219,127 B2 | 5/2007 | Huck et al. |
| 7,222,305 B2 | 5/2007 | Teplov et al. |
| 7,260,840 B2 | 8/2007 | Swander et al. |
| 7,321,936 B2 | 1/2008 | Zimmerman et al. |
| 2001/0007137 A1 | 7/2001 | Suumaki et al. |
| 2001/0049717 A1 | 12/2001 | Freeman et al. |
| 2002/0016827 A1 | 2/2002 | McCabe et al. |
| 2002/0016851 A1 | 2/2002 | Border |
| 2002/0034173 A1 | 3/2002 | Border et al. |
| 2002/0049608 A1 | 4/2002 | Hartsell et al. |
| 2002/0059622 A1 | 5/2002 | Grove et al. |
| 2002/0065864 A1 | 5/2002 | Hartsell et al. |
| 2002/0071434 A1 | 6/2002 | Furukawa |
| 2002/0071438 A1 | 6/2002 | Singh |
| 2002/0080721 A1 | 6/2002 | Tobagi et al. |
| 2002/0089930 A1 | 7/2002 | Aceves et al. |
| 2002/0089972 A1 | 7/2002 | Chang et al. |
| 2002/0089977 A1 | 7/2002 | Chang et al. |
| 2002/0090006 A1 | 7/2002 | Chang et al. |
| 2002/0091884 A1 | 7/2002 | Chang et al. |
| 2002/0095400 A1 | 7/2002 | Johnson et al. |
| 2002/0097713 A1 | 7/2002 | Chang et al. |
| 2002/0098840 A1 | 7/2002 | Hanson et al. |
| 2002/0099851 A1 | 7/2002 | Shah et al. |
| 2002/0101860 A1 | 8/2002 | Thornton et al. |
| 2002/0105972 A1 | 8/2002 | Richter et al. |
| 2002/0107903 A1 | 8/2002 | Richter et al. |
| 2002/0107962 A1 | 8/2002 | Richter et al. |
| 2002/0107971 A1 | 8/2002 | Bailey et al. |
| 2002/0107989 A1 | 8/2002 | Johnson et al. |
| 2002/0107990 A1 | 8/2002 | Johnson et al. |
| 2002/0108059 A1 | 8/2002 | Canion et al. |
| 2002/0112152 A1 | 8/2002 | VanHeyningen et al. |
| 2002/0116452 A1 | 8/2002 | Johnson et al. |
| 2002/0138551 A1 | 9/2002 | Erickson |
| 2002/0138618 A1 | 9/2002 | Szabo |
| 2002/0141418 A1 | 10/2002 | Ben-Dor et al. |
| 2002/0150064 A1 | 10/2002 | Lucidarme |
| 2002/0191600 A1 | 12/2002 | Shah et al. |
| 2003/0002484 A1 | 1/2003 | Freedman |
| 2003/0014623 A1 | 1/2003 | Freed et al. |
| 2003/0014628 A1 | 1/2003 | Freed et al. |
| 2003/0023746 A1 | 1/2003 | Loguinov |
| 2003/0035370 A1 | 2/2003 | Brustoloni |
| 2003/0035413 A1* | 2/2003 | Herle et al. .......... 370/352 |
| 2003/0105977 A1 | 6/2003 | Brabson et al. |
| 2003/0115331 A1 | 6/2003 | Xie et al. |
| 2003/0117992 A1 | 6/2003 | Kim et al. |
| 2003/0120802 A1 | 6/2003 | Kohno |
| 2003/0120811 A1 | 6/2003 | Hanson et al. |
| 2003/0123394 A1 | 7/2003 | Neale et al. |
| 2003/0123481 A1 | 7/2003 | Neale et al. |
| 2003/0131079 A1 | 7/2003 | Neale et al. |
| 2003/0131263 A1 | 7/2003 | Keane et al. |
| 2003/0149715 A1 | 8/2003 | Ruutu et al. |
| 2003/0187975 A1* | 10/2003 | Brown et al. .......... 709/224 |
| 2003/0191799 A1 | 10/2003 | Araujo et al. |
| 2003/0200290 A1 | 10/2003 | Zimmerman et al. |
| 2003/0202480 A1 | 10/2003 | Swami |
| 2003/0223361 A1 | 12/2003 | Hussain et al. |
| 2003/0229718 A1 | 12/2003 | Tock et al. |
| 2003/0233581 A1 | 12/2003 | Reshef et al. |
| 2003/0236837 A1 | 12/2003 | Johnson et al. |
| 2003/0236887 A1 | 12/2003 | Kesselman et al. |
| 2003/0236919 A1 | 12/2003 | Johnson et al. |
| 2004/0001691 A1 | 1/2004 | Li et al. |
| 2004/0006643 A1 | 1/2004 | Dolson et al. |
| 2004/0008693 A1 | 1/2004 | Grove et al. |
| 2004/0022263 A1 | 2/2004 | Zhao et al. |
| 2004/0031058 A1 | 2/2004 | Reisman |
| 2004/0078465 A1 | 4/2004 | Coates et al. |
| 2004/0085902 A1 | 5/2004 | Miller et al. |
| 2004/0107360 A1 | 6/2004 | Herrmann et al. |
| 2004/0127131 A1 | 7/2004 | Potnis |
| 2004/0141525 A1 | 7/2004 | Bhushan et al. |
| 2004/0174886 A1 | 9/2004 | Packer |
| 2004/0250124 A1 | 12/2004 | Chesla et al. |
| 2004/0258003 A1 | 12/2004 | Kokot et al. |
| 2005/0078171 A1 | 4/2005 | Firestone et al. |
| 2005/0080876 A1 | 4/2005 | Peiffer et al. |
| 2005/0089049 A1 | 4/2005 | Chang et al. |
| 2005/0135250 A1 | 6/2005 | Singh et al. |
| 2005/0135252 A1 | 6/2005 | Singh et al. |
| 2005/0195835 A1 | 9/2005 | Savage et al. |
| 2005/0220086 A1 | 10/2005 | Dowling |
| 2005/0223114 A1 | 10/2005 | Hanson et al. |
| 2005/0223115 A1 | 10/2005 | Hanson et al. |
| 2005/0229237 A1 | 10/2005 | Xie et al. |
| 2005/0232161 A1 | 10/2005 | Maufer et al. |
| 2005/0265353 A1 | 12/2005 | Sengupta et al. |
| 2006/0064716 A1 | 3/2006 | Sull et al. |

OTHER PUBLICATIONS

Border, J. et al.. 'PILC: Performance Enhancing Proxies (PEPS). 46th IETF, Nov. 10, 1999. pp. 1-17.

Border. J. et at.. Performance Enhancing Proxies Intended to Mitigate Link Related Degradations.' PILC—Perfomance Enhancing Proxies. Jun. 2001, pp. 1-4, RFC 3135.

Davison. B. et al.. 'A Split Stack Approach to Mobility-Providing Performance-Enhancing Proxies.' Lehigh University, Nov. 2002. pp. 1-1 3, Bethlehem, PA.

Dutta D. et al., An Active Proxy Based Architecture for TCP in Heterogeneous Variable Bandwidth Networks, Proceedings of IEEE Globecom 2001, vol. 4, p. 2316-2320, Nov. 2001.

Ehsan, N. et al., Evaluation of Performance Enhancing Proxies in Internet Over Satellite, International Journal of Communication Systems, Sep. 17, 2002. 22 pages.

Feighery P., Frequently Asked Questions (FAQ) for Performance Enhancing Proxies (PEPS). Hints on How to Configure PEPs, Online document, Jun. 27, 2005.

Fendick et al., ACM SIGCOMM Computer Communication Review, vol. 22 , Issue 4, pp. 136-148, Oct. 1992.

International Preliminary Report on Patentability, PCT/US2004/024655, Feb. 9, 2006, 7 pages.

International Search Report for PCT/US2008/056684, mailed on Jan. 28, 2009.

Ishac J. et al., Proceedings of IEEE MILCOM 2001, vol. 1, pp. 700-704, 2001.

Jing J. et al., Client Server Computing in Mobile Environments, ACM Computing Surveys, vol. 31, No. 2, pp. 117-157, Jun. 1999.

Kalampoukas et al., Improving (TCP) Throughput over Two-Way Asymmetric Links: Analysis and Solutions, In Proc. of Sigmetrics, pp. 78-89, 1998.

Mathis et al., RFC 2018—TCP Selective Acknowledgement Options, Oct. 1996, http://www.faqs.org/rfcs/rfc2018.html.

Office Action, USPTO, U.S. Appl. No. 10/901,952, mailed on Sep. 14, 2007.

Office Action, USPTO, U.S. Appl. No. 10/696,507, mailed on Nov. 14, 2007.
Office Action, USPTO, U.S. Appl. No. 10/902,491, mailed on Dec. 28, 2007.
Office Action, USPTO, U.S. Appl. No. 10/902,493, mailed on Jan. 7, 2008.
Office Action. USPTO, U.S. Appl. No. 10/901,940, mailed on Feb. 20, 2008.
Office Action. USPTO, U.S. Appl. No. 10/902,509, mailed on Mar. 18, 2008.
Office Action, USPTO, U.S. Appl. No. 10/901,691, mailed on Mar. 20, 2008.
Office Action. UPSTO, U.S. Appl. No. 10/696,507, mailed on Apr. 1, 2008.
Office Action, USPTO, U.S. Appl. No. 10/901,952, mailed on Apr. 24, 2008.
Office Action, USPTO, U.S. Appl. No. 10/902,491, mailed on Jul. 22, 2008.
Office Action, USPTO, U.S. Appl. No. 10/901,940, mailed on Aug. 5, 2008.
Office Action, USPTO, U.S. Appl. No. 10/902,509, mailed on Aug. 13, 2008.
Office Action, USPTO, U.S. Appl. No. 10/901,691, mailed on Sep. 29, 2008.
Office Action, USPTO, U.S. Appl. No. 10/696,507, mailed on Nov. 13, 2008.
Office Action, USPTO, U.S. Appl. No. 10/902,509, mailed on Nov. 18, 2008.
Office Action, USPTO, U.S. Appl. No. 10/902,491, mailed on Jan. 5, 2009.
Office Action, USPTO, U.S. Appl. No. 10/901,940, mailed on Jan. 8, 2009.
Office Action, USPTO, U.S. Appl. No. 10/902,493, mailed on Jan. 21, 2009.
Office Action, USPTO, U.S. Appl. No. 10/901,691, mailed on Feb. 27, 2009.
Office Action, USPTO, U.S. Appl. No. 10/901,952, mailed on Mar. 16, 2009.
RFC 3040—Internet Web Replication and Caching Taxonomy, Jan. 2001.
Samaraweera, Return link optimization for internet service provision using DVB-S networks, ACM SIGCOMM Computer Communication Review, vol. 29, Issue 3, pp. 4-13, Jul. 1999.
Santos J. et al., Increasing Effective Link Bandwidth by Suppressing Replicated Data, Proceedings of the Annual Technical Conference on USENIX, pp. 213-224, Jun. 1998.
Spring N. et al., A Protocol Independent Technique for Eliminating Redundant Network Traffic, Proceedings of SIGCOMM 2000, Aug. 2000.
Vangala. S. et al., 'Performance of TCP Over Wireless Networks With the Snoop Protocol.' University of South Florida, 2 pages, Tampa, FL.

* cited by examiner

METHOD OF DETERMINING PATH MAXIMUM TRANSMISSION UNIT

RELATED APPLICATIONS

This application is a continuation of and claims priority to U.S. patent application Ser. No. 10/696,507, entitled "Method of Determining Path Maximum Transmission Unit", and filed on Oct. 29, 2003, which claims priority to U.S. Provisional Application No. 60/422,801 filed on Oct. 30, 2002, both of which are incorporated herein by reference in their entirety.

FIELD OF INVENTION

This invention pertains to the field of the processing of computer networks, networking equipment and networking protocols, in particular to systems that enhance the performance of existing networking applications through the deployment of additional networking entities known as proxies.

BACKGROUND

Many computer networking technologies and protocols are well known. One of the most widely used protocols is the internet protocol (IP). IP is a connectionless, best-effort, unreliable, routable networking protocol. Applications that require reliable communications typically use the Transmission Control Protocol (TCP) on top of IP. The TCP protocol layer provides required functionality such as flow control, packet loss detection, lost packet retransmission, congestion avoidance, etc. (hereinafter referred to as upper-layer behaviors) that are needed to provide reliable communications over the unreliable IP networking substrate. This pair of networking protocols is common enough that they are often referred to jointly as TCP/IP. Detailed descriptions of TCP and IP are found in RFC 792 and RFC 793, which are herein incorporated by reference.

Research has developed a simple model that predicts the maximum performance of TCP implementations that use the standard congestion avoidance algorithm (TCP Reno and TCP Tahoe). One good explanation of this model and its derivation is in a paper by Matthew Mathis, Jeffrey Semke, and Jamashid Mahdavi, entitled "The Macroscopic Behavior of TCP Congestion Avoidance Algorithm", herein incorporated by reference. Equation 3 of the paper provides a simple model of TCP performance:

$$BW=(MSS*C)/(RTT*SQRT(P))$$

Where:
BW=Bandwidth for the TCP Connection
MSS=Maximum Segment Size, i.e., the size of the packets being transported
RTT=Round Trip Time
P=Percentage of packet loss in the network
C=A constant One of the surprising results of this model is that maximum TCP performance is unrelated to network speed. Another surprising result is that maximum performance is inversely related to round trip time (RTT).

Other phenomena may limit performance below what the model provides as a maximum. For example, if the receiver does not advertise a window that is at least as large as the bandwidth delay product of the connection, then maximum TCP performance will be limited accordingly. Standard implementations of TCP are also known to perform poorly in certain environments and/or conditions. For example, the high rate of packet loss in typical wireless links results in poor TCP performance.

One method of correcting many of these problems is to modify the TCP implementation of one or both of the participants. However, this is frequently not a viable option such as when the source code is unavailable or when there are too many endpoints to conveniently manage.

Another method is to interpose another element in the TCP conversation. This element, called a Performance Enhancing Proxy (PEP), applies algorithms to manipulate the conversation so as to overcome the performance limitations. Many types of PEPs and PEP algorithms are known; the reader is directed to RFC 3135, herein incorporated by reference, for a detailed discussion of PEPs.

Deployment of PEPs in a network is known by providing a new network processing node and routing packets through it. This technique suffers from at least two disadvantages: firstly, the extra expense of the additional processing node and its associated administrative overhead; and secondly, the PEP often requires redundant processing due to the poor integration with the other nodes of the network.

Another method of deploying a PEP is to insert it into the software driver stack of a node. Many operating systems provide the ability to insert a software agent (shim) between the TCP/IP processing stack and the driver for the network interface card (NIC). There are many advantages to this method. One advantage is that no changes to the operating system are required, which, in any event, may be impossible since access to the source code is frequently limited. Even with access to the source code of an operating system, the operational issues associated with supplying and supporting customized versions of the operating system make this prohibitive in many environments.

It is desirable that the addition of PEPs (either in shim or stand-alone form), be done in such a way as to minimize changes required to other nodes of the network. In particular, no changes should be required to existing utilities and application programs. No changes to firewall settings, routing tables, or port assignments should be required. No retraining of users or network operations staff should be required. No re-installation of applications or utilities should be required. New software that is being developed should be able to take advantage of PEP capabilities without any change to the development process or to the software itself.

Ideally, existing network equipment and software, both on the Local Area Network (LAN) and the Wide Area Network (WAN), should not require any modification, aside from the addition of the invention.

The PEP itself should not require substantial system resources, such as random access memory or disk storage. Requiring large amounts of these resources not only increases system expense, but requires additional environment attention (more power, more space, etc.) and also reduces overall system reliability.

The communications protocols used by the PEP should adhere to the standard TCP/IP protocols as they currently appear on the network, minimizing any disruption to existing network software or equipment and ensuring compatibility with new equipment that is currently in development now or in the future by inventors not aware of the present invention. Some prior art techniques translate the TCP/IP protocol into other protocols (e.g., User Datagram Protocol (UDP)), causing disruption to network monitoring, traffic shaping, Quality of Service (QoS), Service Level Agreement (SLA), statistics measuring applications, and others; they also require modifications to firewall and security settings due to the usage of protocols that were not previously employed. Worse, applications environments and settings will require modification to direct traffic flows to explicitly designated transcoding network nodes.

Security techniques that are currently deployed should be preserved wherever possible. The ideal PEP should be fully functional in the presence of modern encryption and authentication techniques.

The PEP should operate incrementally, with a minimal increase in the latency of data transmission. It should not require access to multiple blocks of data before data transmission can begin. The latency of data transiting a PEP should be minimized.

The algorithms employed by a PEP should not be subject to any arbitrary limits. They should scale to any arbitrary speed and handle any type of connection media, including high-delay satellite links, high loss-rate wireless and power-line networking links, and others. The algorithms should function properly in the presence of standard traffic management techniques. Plus, it should smoothly operate with any existing Quality of Service (QoS) or service level agreement (SLA) architecture that might be deployed, allowing these systems to limit the performance of the original endpoint, just as though the PEP were not present.

TCP connection characteristics can be measured along multiple dimensions. A partial list of the dimensions includes: RTT, connection bandwidth, aggregate loss rate, connection lifetime, application burstiness, and others. Across all of these dimensions, no algorithm can be optimal. A PEP should monitor the connection, characterizing it as conditions change, adapting the PEP algorithms accordingly.

One example of prior art is the Transporter Fountain from Digital Fountain Corporation of Fremont, Calif. The product is intended to transfer files across large RTT links without the performance limits that standard File Transfer Protocol-based (FTP) techniques suffer from. (FTP uses TCP/IP which has the performance limit described above.) This product consists of a "box" that the user connects to his network. The user must explicitly copy the files to be transferred to the box before the files can be transferred. Thus, all applications programs and scripts that wish to utilize the product must be changed to utilize the new box with its proprietary command set. Further, the transfer protocols used by the product are UDP based, requiring the modification of network settings, such as security, QoS, SLA, traffic management, and others. The transcoding from FTP to UDP interferes with any network element that might attempt to process the individual TCP connection, such as QoS, SLA or traffic management.

Another example of prior art is the Sequence Reducer from Peribit Corporation of Santa Clara, Calif. This product provides data compression using advanced data sequence recognition techniques developed for the Human Genome project. However, general-purpose lossless data compression is typically limited to a two- to three-times reduction in data, placing an upper limit on the total performance improvement that can be provided by this technique. Further, many data types are already compressed, wasting system resources attempting any further compression for these data types. The computational expense of this method requires the addition of an extra box to the network and limits the speed at which packets can be processed. Current CPU technology seems to limit processing speeds to about 45 Mb/sec (T3) for any one connection. Current data link speeds are well in excess of this limit and growing at a faster rate than CPU performance is growing. The product does not address the fundamental limits of the TCP/IP protocol and is thereby permanently limited to a maximum of two- to three-times performance improvement over offerings without the PEP.

Consequently, a new method of deploying of PEPs is required to efficiently integrate them into a network. These PEPs must supply algorithms that remove the performance limitations inherent in TCP implementations.

SUMMARY OF INVENTION

A method of detecting the maximum transmission unit of a path between two performance enhancing proxies is disclosed. A client sends packets that are received by an upstream proxy. Periodically, the upstream proxy determines that it will attempt to determine if the PMTU has increased above its current estimate. The upstream proxy estimates a new PMTU value and repacketizes the received packet stream accordingly. The new packets are transmitted to a downstream proxy. Upon arrival, the downstream proxy determines if fragmentation of the packets has occurred. The downstream proxy notifies the upstream proxy of the determination. The upstream proxy uses the notification from the downstream proxy to retain, revert or alter the new estimated PMTU.

DETAILED DESCRIPTION OF THE PREFERRED EMBODIMENT

Figure 1:
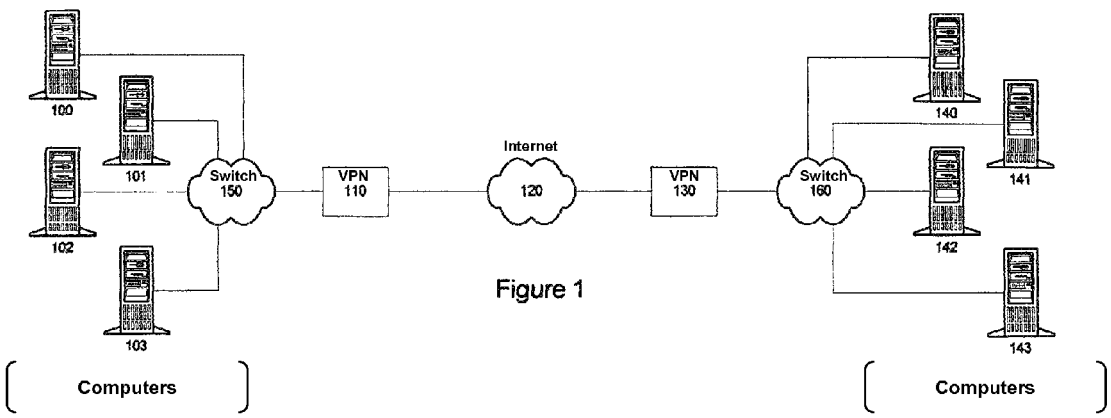
FIG. 1 depicts a Virtual Private Network gateway.

The present invention addresses the deficiencies of prior art PEPs. Several advances in the state of the art are provided, eliminating numerous barriers to deployment present in the prior art solutions. The present invention can be deployed into a network without requiring significant additional resources. The present invention is not fundamentally limited in its performance boost by RTT. Minimal additional latency is introduced by its presence in the network, allowing the PEP benefits to be extended to connections with small RTTs. Distributed implementations of the present invention support redundantly connected networks in order to provide superior reliability and scalable performance.

No changes in the network topology are required to obtain the benefits of the invention. No changes in application or utility programs or operational procedures are required. The invention interoperates seamlessly with the existing security, performance, QoS, SLA, traffic, and network management infrastructure. Usage of existing standard protocols and packet formats allows the invention to be deployed without modification to any part of the network and ensures compatibility with current and future developments in network processing devices.

Though the practitioner understands that the TCP protocol is bidirectional (i.e., every sender is also a receiver), and that every packet may contain information for both directions, this specification will normally describe only one direction of the TCP conversation. It should be understood that the techniques and methods described herein may be applied to one or both directions of a TCP connection, serially and/or simultaneously. In places where the bidirectional nature requires special handling, this specification will address specifically those issues when encountered.

Packet-switched networks are constructed of interior and endpoint elements. An endpoint element is either a sender or receiver of data, i.e., a place where data enters or exits the network. Typically, an endpoint consists of a network interface card (NIC) for performing physical data reception and transmission and software running on a microprocessor (CPU) that processes the data packets. A new trend in endpoints is to recast portions of the processing software into hardware, improving system performance by reducing CPU processing. Endpoints can be dedicated processing devices as well as general-purpose computers. Many types of dedicated processing devices are known to have IP endpoints including: storage arrays, storage array controllers, storage switches, Fibre Channel bridges, remote tape libraries, disk arrays, file servers, mail servers, personal digital assistants (PDA), handheld computers, cellular phones, embedded computer systems, personal video recorders, media appliances, and others.

Many types of interior elements are known including: hubs, bridges, switches, routers, bridging routers, modems, gateways, and others. The interior elements may be divided into two categories: modifying and non-modifying. A non-modifying interior element passes packets through it without modifying the packet data. Typical nonmodifying interior elements include: hubs, bridges, switches, and others. Note that many interior elements also contain endpoints for maintenance, control, monitoring, and other reasons. Modifying interior elements perform some alteration of packets as they transit. Examples of modifying interior elements include: routers, gateways, modems, base stations, and others.

PEP Costs and Algorithms Classes

The interior elements of networks can be connected in many configurations. Often, redundant transmission paths are created to improve bandwidth and/or reliability. As described in RFC 3135, adding a PEP to a network requires consideration of the network topology. PEP algorithms can be classified with respect to network topology. One class of PEP algorithms requires that all packets associated with a single TCP connection pass through the same PEP instance (full-duplex). Another class of TCP PEP algorithms requires that only the data for one direction of a TCP connection pass through the same PEP instance (half-duplex). Yet another class of TCP PEP algorithms has no restriction of this type (unrestricted). Deployment of full- and half-duplex PEP algorithms may be restricted depending on the implementation of a PEP "instance".

Invariably, there is a cost to adding a PEP to a network. The cost manifests itself both through increased computation requirements (i.e., associated with actually performing the PEP algorithm itself) and increased latency. Indirect effects of the increased latency (hence increased RTT) caused by the transit of a packet through the PEP implementation include reduced TCP throughput and increased packet memory requirements. These increased costs may result in a situation where the benefits of the algorithms provided by the PEP are insufficient to overcome the additional costs either in computation, latency, or both, resulting in an overall degradation of the system. An intelligent PEP will detect this situation and disable the algorithms that cause the degradation. In a preferred embodiment, the PEP algorithm that compensates for long RTT connections is disabled when the RTT of an individual connection is sufficiently low.

As another example, a PEP algorithm for repacketization might be disabled when the connection is to a well-known port for an application program known to provide maximum-sized packets. In the case where the PEP does not initially know that repacketization can be disabled, the PEP enables repacketization and observes the transiting traffic. Observation may indicate that repacketization is unnecessary, at which time the PEP disables the algorithm, thereby reducing processing time and decreasing latency. This decision need not be irrevocable. Observation of a connection with disabled repacketization may conclude that it is profitable to re-enable repacketization. Observation need not be continuous; intermittent observation will function equally well for many applications and further reduces processing requirements.

Also, implementation techniques that minimize latency through the PEP are beneficial. The PEP contains a list of TCP connections that are known to have no PEP algorithms enabled. Upon receiving an incoming packet, the PEP consults the list. If the packet belongs to a connection in the list, then the PEP immediately forwards the packet without applying any PEP algorithms. This "fast path" through the PEP reduces latency.

A second list contains rules for determining which PEP algorithms should be attempted for new connections. When the PEP receives a connection-initiating packet for TCP, it consults the rules list to determine if PEP algorithms should be attempted or if the fast path should be applied. The second section contains rules based on IP addresses and TCP port numbers.

Some PEP algorithms can be enabled or disabled on a packet-by-packet basis. These algorithms can monitor the conversation and adjust themselves accordingly. Other PEP algorithms only can be enabled or disabled when the TCP conversation is initiated. These algorithms monitor the connection open sequence (SYN packets) to make their choice. Other algorithms only can be enabled at open time, but can be abandoned at any point afterwards.

As described above, certain PEP algorithms require all of the connection data (either full- or half-duplex, hereinafter x-duplex) to flow through them. Deployment of these algorithms is conditional upon knowing that the x-duplex condition exists. Since network topologies can vary over time and since there is no topology change notification mechanism in an IP network, a PEP should be able to detect the creation and the destruction of the x-duplex condition. Detection of the negative x-duplex condition allows the PEP to disable the algorithms that would malfunction. It is acceptable for the detection algorithm to generate false negatives (i.e., where the detection algorithm incorrectly asserts a negative x-duplex condition) as the system continues to operate correctly, although the performance benefits of the disabled PEP algorithm are not obtained. In general, it is not possible for the PEP directly to detect the existence of the x-duplex condition; however, it can detect it indirectly simply by assuming its existence and then detecting a negative x-duplex condition. One simple technique for detecting a negative x-duplex condition is to monitor the packet stream and look for acknowledgements to packets that have not been seen, this is an indication that packets are being sent through a different path. This technique is very accurate, generating false negatives only in the presence of a malicious third party (i.e., a node injecting packets into another endpoint's connection). Another method of detecting the negative x-duplex condition is to monitor timeouts. Too many timeouts in a time horizon are a strong indication of the negative x-duplex condition.

The x-duplex condition is a characteristic of network topology, not of an individual connection. Thus, when the PEP makes an assertion of the x-duplex condition, it applies not only to that connection, but to all other connections that are part of the same flow (see below for the definition of flow).

Packet Flow

A flow is the collection of packets and connections that passes through the same two nodes on the network. There may be variations in the routing before, between, and after the two nodes. Packets belonging to a flow share the same path maximum transmission unit (PMTU) and share the bandwidth of the network connections between the two nodes. Many PEP algorithms may be applied to all connections within a flow. For example, recongestion and repacketization operations are applied to all packets within a flow, optimizing the usage of system resources.

Distributed PEPs

Using well-known techniques of distributed computing (e.g., shared memory, clustering, replication, etc.), a single PEP instance can consist of multiple PEP members that communicate among themselves. These members share data so that they can jointly and individually perform PEP processing while simultaneously maintaining the coherence of a single PEP instance. The benefits of distributed PEP processing are scaling in performance, capacity and reliability. Performance scaling comes from improving the processing of a single TCP connection. Capacity scaling comes from increasing the total number of connections that can be handled. Reliability scaling comes from having multiple cooperating implementations that can survive the failure of one or more members. Distributed PEPs, that have members along all network paths for which a TCP connection may traverse, are able to implement those PEP algorithms that require access to all of the packets for a TCP connection (either half- or full-duplex), whereas multiple instances of nondistributed PEPs in a similar configuration would not be able to implement these same PEP algorithms. A distributed PEP can be deployed in environments that include link aggregation, multi-homing, link failover, and multiply interconnected networks.

As is typical of distributed computing, portions of some PEP algorithms require global consistency. These portions necessitate that a single packet not completely traverse one cooperating PEP member until all of the members have been updated to a consistent state. This update increases the per-packet computation cost, as well as potentially adding to the latency of the system. Just as with nondistributed PEPs, these increased costs may result in overall degradation. Again as with nondistributed PEPs, careful monitoring of the TCP conversation allows the appropriate algorithms to be enabled and disabled so as to avoid degradation.

Communication between PEP members can be accomplished in a variety of ways: through common memory or via an external message facility, like a packet-switched network or a communications bus. As the communications method becomes more expensive, the costs of the PEP cooperation increase accordingly, raising the crossover point to yield a PEP benefit.

There are at least two cooperation models for distributed PEPs: tightly coupled and loosely coupled. In the tightly coupled model, communication between the PEP members is inexpensive and low latency when compared to network communication; this is typically provided via shared memory, although a high-speed inter-processor communication link would suffice (e.g., Myrinet, Infiniband, Ethernet, etc.). In a tightly coupled PEP, global consistency is easy to achieve, as only a single copy of the data structures is present and simple locking schemes provide orderly and coherent access. A tightly coupled distributed PEP can scale in all three directions described above (performance, capacity, and reliability).

In the loosely coupled distributed PEP model, communication between the PEP members is more expensive and must be carefully considered, as the overhead of communication between PEP members is a principal design constraint.

In one embodiment, individual TCP connections are assigned to individual PEP members. When a PEP member receives a packet pertaining to a TCP conversation that is assigned to another PEP member, it forwards the packet to that PEP member for processing. This method requires global synchronization only during connection establishment and termination, at other times no global synchronization is required. When a PEP member receives a connection initiation or termination packet, it communicates with the other members to update their connection tables. Upon receipt of a connection initiation packet, the receiving PEP member determines which member this connection will be placed on (i.e., performs a load-balancing selection) and informs all of the PEP members of the choice for the new connection. Once all the members have responded, indicating that their tables have been updated, the establishment of the connection can be allowed to proceed by forwarding the connection initiating packet. By waiting for this global synchronization, the distributed PEP members will be certain to understand how to forward (i.e., which PEP member is responsible for) any further packets associated with this conversation. It is possible that two PEP members will receive connection initiation packets for the same connection simultaneously (i.e., before they have had a chance to communicate). The PEP must detect this case, ensuring that the connection table remains globally consistent; typically, one of the two packets is simply ignored. This method guarantees that all the packets associated with a single TCP connection are processed by a single PEP member, enabling the application of the PEP algorithms that require access to all of the conversation data (i.e., full- or half-duplex). This model of implementing a distributed PEP does not provide performance scaling, in that a single TCP connection can run no faster than the limit of a single PEP member. However, when multiple TCP conversations are present, they can be distributed among the plurality of members so that, in aggregate, overall performance is improved, as each individual connection has the PEP algorithms implemented on it. Another advantage of this scheme is that it is relatively easy to disable PEP algorithms for individual TCP connections. This information can be distributed in the same fashion, at which point any of the PEP members can process packets for that TCP connection without forwarding it to other PEP members, minimizing the additional latency imposed on the connection.

Implementation of the tightly coupled model does not require a single table for globally consistent information. The table can be distributed, provided that it is maintained consistently as packets transit the members. Naturally, the cost of maintaining the distributed, consistent tables may result in increased latency and computation costs. However, for connections with very high RTTs, relatively expensive member interconnections can be utilized while still obtaining substantial system-level performance boosts.

Several strategies for handling failover can be realized within both the tightly and loosely coupled distribution models. A failover condition occurs when one of the PEP members fails, or when the network path through one of the PEP members ceases to operate (due to failure, operator request, routing change, etc.). Recovery is defined as the procedure that the system uses to recover from a failover condition. In the tightly coupled configuration, recovery is relatively easy to perform, as the globally consistent state is still available to all remaining PEP members. Typical recovery actions involve ensuring the integrity of shared data structures and addressing the reduction in overall capacity due to the failure.

Recovery in a loosely coupled environment is more difficult, since not all of the PEP algorithm's information for each connection may have been globally synchronized, making it impossible to continue with those connections (depending on the particular algorithm). If the connection cannot be continued, then it must be resynchronized and the endpoints will need to invoke their own recovery algorithms.

Sometimes a connection can be transferred from one PEP member to another member. This action, called migration, can be initiated for several reasons. One reason is due to loading issues, (i.e., a PEP member may be overloaded and will use the migration of a TCP connection to a different PEP member as a method of rebalancing the system load). Another reason is external routing change, (i.e., one PEP member may notice that the preponderance of packets for a TCP conversation is arriving at a PEP member that doesn't own the connection; rather than continuing to pay the costs of internally forwarding those packets to the owning member, the connection is migrated to the member that is receiving the preponderance of packets). Another reason is route failure. The owning PEP member may lose connectivity to one or both of the endpoints. The connection is migrated to another PEP member to reestablish connectivity. Yet another reason is member failure. Connections owned by a failing member are migrated to operational members.

Migration is similar to connection establishment. First, packet forwarding for the connection is suspended. Second, the connection table of the PEP members is updated to indicate the new owner. Finally, packet forwarding is enabled (naturally, any packets received during this process must be forwarded to the new owner).

PEP Deployment

When adding a PEP to a network, there are many choices for the deployment vehicle. One method of deployment is to create a new interior element. This element may have one or more network connections and may contain facilities for performing the selected PEP algorithms on the packets that flow through it. Another option is to deploy the PEP within an already existing element, either interior or endpoint. In general, a PEP can be deployed in either an endpoint or interior element configuration. As described above, network topology affects the classes of PEP algorithms that can be enabled. Multiple deployed implementations of PEPs, either in endpoints or interior nodes or both, may cooperate to create a single distributed PEP instance, as described above.

Certain network interior nodes are natural places to deploy PEPs, as they tend to aggregate network traffic, reducing the number of members required to create a distributed PEP instance. Additionally, these nodes tend to be the most profitable places to locate performance-boosting PEP algorithms. For example, a wireless base station is a natural place to deploy a PEP, as all traffic between wireless nodes and the wired network must pass through it. Further, there are many PEP algorithms that would be ideal in improving the performance of the high error-rate wireless link.

Another natural PEP deployment point is the Virtual Private Network gateway (VPN). FIG. 1 depicts one example of a VPN gateway. Computers 100-103 are connected to switch 150. Communication between computers 100-103 are routed amongst each other by switch 150, as directed by the routing tables contained therein. Likewise, computers 140-143 communicate through switch 160, to which they are connected.

When one of computers 100-103 (100 in further usage) sends a packet destined for one of computers 140-143 (140 in further usage), switch 150, using its routing tables, directs these packets to VPN gateway 110. VPN 110 accepts these packets and inspects them. Using its own routing tables, VPN 110 determines that these packets must be forwarded to VPN 130. Each of the packets to be forwarded is placed into an envelope that specifies VPN 130 as the destination and then the packet is sent to internet 120. Internet 120 forwards the packet to VPN 130, which removes the packet from its envelope and forwards it to switch 160, which then forwards it to computer 140. Because the packet, while traveling over the internet, is placed inside an envelope, the contents and format of the original packet do not affect, and are unaffected by, its transport via internet 120. Typically, cryptographic techniques are used to hide the contents of the packet, ensuring that no intermediate node is able to examine the packet. Other cryptographic techniques can be employed to allow the receiving node to detect if a packet has been altered after initial transmission. In this case, the altered packet can simply be dropped, whereupon the upper-level behavior will detect this and retransmit an original copy. Note that internet 120 need not be the public internet, it could be any particular network, public or private. Note further that the use of the term "switch" should be understood to include all forms of switching, including routing, bridging, forwarding, and others.

This technique allows the use of internet 120 as a private link between the two VPN instances. Indeed, the addressing domain of the packets used by computers 100-103 and 140-143 and switches 130 and 160 are distinct and possibly separate from that used by internet 120. Further, the packets contained within the envelopes may contain protocols unknown to internet 120.

The transport of the contained packets through the internet in this fashion is commonly known as tunneling. The network interface that connects the VPN to internet 120 is known as the wide-area network (WAN) side. The other VPN network interface is known as the local-area network (LAN) side. Note that in some configurations, the separation of WAN- and LAN-sides of the VPN is logical and not physical (i.e., there may be only a single network connection over which both sets of traffic are multiplexed).

VPN 110 may be combined with switch 130, yielding certain efficiencies due to sharing of resources and computations. Likewise, VPN 140 may be combined with switch 160.

When computer 100 and computer 140 communicate using the TCP protocol, VPN 110 and 130 typically perform little or no special processing, as compared to the other internet protocols. Each TCP packet is placed into its envelope and transmitted to the other VPN participant. Each TCP endpoint remains ignorant of the presence of the intermediate VPN nodes or of internet 120.

There are many choices for the protocol used for the VPN tunnel. Two of the most common protocols are: Internet Protocol Security (IPSec) and Layer 2 Tunneling Protocol (L2TP). These protocols do not provide reliable communications, as they simply layer over IP with minimal additional services. Another common protocol is Point to Point Tunneling Protocol (PPTP), which uses an additional TCP connection to provide reliable communication between the two VPN nodes.

For those tunneling protocols that use unreliable communications, the TCP endpoints remain solely responsible for the upper-level TCP behaviors, as these VPN protocols do not provide them.

In the case of PPTP (as well as other protocols that use TCP for the tunnel), the VPN's upper-level TCP behaviors may interact with the upper-level TCP behaviors of the endpoints (computers 100 and 140). This interaction may severely limit the performance of the TCP connection between computers 100 and 140. For example, packets that are dropped by internet 120 must be retransmitted. Initially, one of the VPN nodes notices that a packet has been dropped, using one of the known TCP methods: duplicate acknowledgements (dupacks) or selective acknowledgements (sacks), retransmitting the lost packet accordingly. However, while the VPN has initiated a retransmit, the TCP implementations in the endpoint computers 100 and 140 may also experience a timeout, since the retransmit by the VPN may take substantially longer than the endpoint's current running estimate of the RTT. In this case, the endpoints will also assume that the packet has been lost and perform their own retransmit. The endpoint retransmit is redundant, as the VPNs are already engaged in retransmitting the missing data. This entire sequence results in an overall degradation of system throughput. The redundantly retransmitted packets may be treated by the VPN as additional packets to be transmitted (i.e., the VPN may fail to recognize a packet received from an endpoint as representing a retransmission, packaging the redundant packet and sending it across the tunnel, also).

There are several ways that a PEP, inserted into the conversation between the endpoint and the VPN, could improve this situation. In one way, upon detecting the unnecessary retransmission, the PEP could simply drop the redundant packet. Detecting the situation requires that the PEP have access to state information for the VPN's TCP (tunnel) connection. This access could be performed in several manners. Firstly, the PEP could be in the same node as the VPN and could access the VPN transmission state directly. Secondly, the PEP could be connected to the WAN side of the VPN, monitoring its packets directly to detect retransmissions. Thirdly, the VPN could explicitly notify the PEP via a message when a retransmission occurs.

As described above, some VPN algorithms use cryptographic techniques to prohibit inspection and/or alteration of the encapsulated packets. If the PEP is connected to the LAN side of the VPN, then it can apply its algorithms to packets prior to their encapsulation, avoiding cryptographic issues. However, a PEP connected to the WAN side of the VPN may be severely limited in the presence of cryptographic protection techniques if it has no access to the clear-text of the encapsulated packets. But, in the case of a VPN tunnel using TCP (e.g., PPTP), the PEP algorithms may be applied to the TCP envelope, provided that the cryptographic techniques are used only to protect the interior packet and not the envelope. With support for a cryptographic NIC, even this restriction can be removed (see below).

Just as it is possible currently to achieve efficiencies by combining VPNs with switches, it is possible to achieve similar efficiencies by combining PEPs with VPNs, PEPs with switches, and PEPs with combined VPN/switches. Further, unexpected benefits beyond simple integration are obtained from such a combination, as described below.

The typical data center configuration results in the principal bandwidth bottleneck occurring right at the VPN node. In such a configuration, the VPN node has a high-speed connection to the LAN and a much lower-speed connection to the WAN. Indeed, when the VPN is integrated into a switch, this mismatch is accentuated, as the VPN may have access to all of the traffic across all the LAN ports of the switch, which usually greatly exceeds the speed of a single WAN link. Further, the connections that pass through the VPN normally have higher RTTs and packet-loss rates than do LAN connections, particularly when the VPN uses the public internet as its tunnel transport.

The VPN is a natural place for making bandwidth allocation decisions; however, the standard VPN lacks efficient mechanisms to implement these decisions. The only bandwidth allocation technique available to the standard VPN is to drop packets, assuming that the sender will reduce his sending rate appropriately. However, this technique is inefficient, resulting in retransmission of data that was otherwise properly received. Further, the technique lacks the ability to provide a fine resolution to the permitted bandwidth, particularly when the sender is using TCP. This is because standard TCP implementations reduce their bandwidth by one-half when a packet is dropped. Also, many TCP implementations will provide data in bursts rather than evenly spaced after a packet drop.

A better flow control mechanism allows the VPN to manipulate the receive window seen by a sending endpoint. Also, since a TCP acknowledgement contains a window advertisement, a VPN can manipulate the window to provide a more effective form of flow control. Thus, the VPN is able to more precisely inform and control the sending rate of the endpoint. However, window manipulation is limited, as once the window is opened to a certain value, the receiver is not permitted to retract the advertisement unless the data has been received accordingly. This limitation imposes a time lag between the decision to reduce a sender's rate and the actual realization of that rate reduction. This rate limiting mechanism can be used by a VPN to efficiently provide a fine-grained control over individual connections.

Other benefits occur when a PEP is combined with a VPN. This combination allows the PEP to have access to clear-text packets lacking cryptographic protection, allowing the maximum opportunities to provide performance enhancements.

Preacks

Another flow control mechanism requires a substantially more sophisticated PEP. When the PEP sees a packet being transmitted to the VPN, it retains a copy of the packet and generates an acknowledgement packet (ACK) back to the sending endpoint, causing the sending endpoint to believe that the packet has been delivered successfully. The PEP is required to retain the packet data should a retransmit be required. If a retransmit is required, the PEP detects the situation and retransmits the missing data. The PEP also monitors acknowledgements generated by the receiving endpoint (or other downstream network entity), so that it can determine when to discard the saved packet data and when to inhibit forwarding acknowledgements for packets that have already been received by the sending endpoint. This early generation of acknowledgements is known as "preacking".

The PEP controls the sender through the delivery of preacks just as though the PEP were the receiving endpoint itself; in effect, terminating the connection at the PEP itself. However, the PEP is not an endpoint and does not actually consume the data, so the PEP must have a mechanism for providing flow control to the sending endpoint. Without flow control, the PEP would require an unbounded amount of memory in which to store packets that had been preacked to the sending endpoint, but which had not yet been acked by the receiving endpoint. One flow control mechanism is to use the standard TCP window. A nonzero window size (actually, a size of at least one Maximum Segment Size (MSS)) in a preack permits the sending endpoint to continue to deliver data to the PEP, whereas a zero window size inhibits further data transmission. This scheme has the advantages of simplicity and adherence to standard TCP methodologies.

One disadvantage of this scheme is the high expense of ACK processing. In the steady-state case, when the sending endpoint has higher bandwidth to the PEP than the PEP to receiving endpoint path, two ACK packets are sent by the PEP, as well as processed by the sending endpoint, for every packet sent by the sender. This occurs as follows: due to the bandwidth imbalance, the sender will eventually fill the PEP (i.e., exhaust the PEP's advertised receive window to the sender), causing the PEP to generate a zero window size ACK packet. Eventually, the (slower) link between the PEP and the receiving endpoint will succeed in delivering a packet, causing the PEP to realize that it is no longer full. The PEP then sends a packet to the sending endpoint, indicating a nonzero window (i.e., the space for the packet just delivered), causing the sending endpoint to deliver another packet, causing the PEP to, once again, generate a zero window size ACK packet to flow control the sender. Thus, for every packet sent by the sender to the PEP, there are two ACK packets sent from the PEP back to the sender (one each with a zero and a nonzero window size).

One technique to reduce this additional overhead is applying hysteresis. When the PEP delivers data to the slower side, the designer can require that a minimum amount of space be available before sending a nonzero window advertisement to the sender. In one embodiment, the PEP waits until there is a minimum of four packets of space available before sending a nonzero window packet (in this case, a window size of four packets). This reduces the overhead by approximately a factor four, since only two ACK packets are sent for each group of four data packets, instead of eight ACK packets for four data packets. However, the "burstiness" of the delivery of packets may be increased, since the sender's window is opened up four packets at a time.

Another technique is to use the TCP delayed ACK mechanism. Standard TCP delayed ACKs automatically delay the sending of an ACK, either until two packets are received or a fixed timeout has occurred. This mechanism alone will result in cutting the overhead in half. By increasing the numbers of packets above two, additional overhead reduction is realized. However, merely delaying the ACK itself is insufficient to flow-control the sender. The PEP must use the advertised window mechanism on the ACKs to actually control the sender. The PEP also must avoid triggering the timeout mechanism of the sender by delaying the ACK too much.

There are many ramifications of preacking, both beneficial and detrimental. In the situation described, preacking is beneficial because it eliminates the need to retransmit packets by the endpoint, thereby saving sender-side bandwidth and sender-side transmission delays (i.e., a reduction in latency). Another benefit is the eliminating of the RTT limitation on the upper bound of TCP performance. However, preacking may have detrimental effects. For example, failure of the PEP instance may result in the two endpoints of the TCP conversation becoming unsynchronized.

Figure 2:
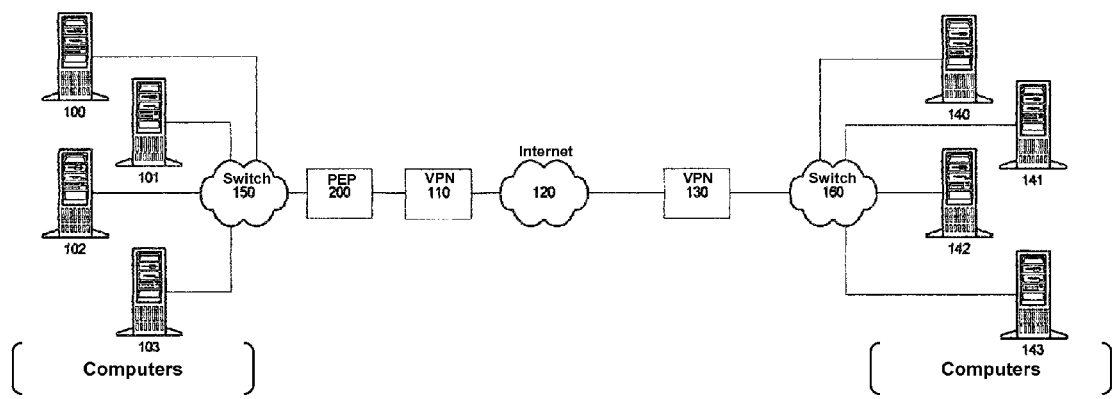
FIG. 2 depicts the Virtual Private Network of FIG. 1 augmented with a single PEP.

FIG. 2 depicts one possible deployment of a single PEP into the system of FIG. 1. Computer 100 sends data to switch 150. Switch 150 determines that this data is destined for VPN box 130. However, because of the chosen LAN topology, all data destined for VPN 130 must transit PEP 200. The algorithms of PEP 200 are applied to the data transiting it. When adapting to long RTT links, several algorithms may be employed.

Window Virtualization

As stated before, insufficient receive window size is one limiter of TCP performance. The receive window sizes of many TCP implementations are limited for various reasons. One reason for the limitation may be a lack of support for well-known protocol extensions (e.g., RFC 1323), that allow the receive window to be increased beyond its standard 16-bit range. Another reason may be the desire to limit the consumption of system buffer memory by each TCP connection, since the advertised receive window carries a promise of dedicated buffer space. The latter is especially crucial in certain system configurations that may have large numbers of relatively idle TCP connections open at any instant. Usually, default window-size settings are set for LAN environments, as these tend to dominate connections in most environments.

Though it is not immediately apparent from examining the literature, there is effectively a send window, also. The send window is similar to the receive window, in that it consumes buffer space (though on the sender), and sometimes serves to limit performance. The sender's send window consists of all data sent by the application that has not been acknowledged by the receiver. This data must be retained in memory in case retransmission is required. Since memory is a shared resource, TCP stack implementations limit the size of this data. When the send window is full, an attempt by an application program to send more data results in blocking the application program until space is available. Subsequent reception of acknowledgements will free send-window memory and unblock the application program. This window size is known as the socket buffer size in some TCP implementations. Unlike the receive window, no network interoperability standard limits the size of the send window, however, many implementations either provide a fixed limit or require source code modifications to utilize a larger window. Like the receive window, the send window represents a promise of reserved memory. Usage of the unqualified term "window" in this specification means either send, receive, or both windows, as implied by the context.

One method of window virtualization is to insert a preacking PEP into the conversation. By preacking the transmission of data, the sender is allowed to transmit more data than is possible without the preacks, thus affecting a larger window size. This technique is most effective when the PEP is located "near" the TCP that lacks large windows. If both communicants are lacking large windows, then two PEPs are required, one near each endpoint to obtain maximum performance. Here, "near" means that the bandwidth delay product of the path between the TCP endpoint and the PEP is less than the maximum window size supported by the TCP endpoint. If the PEP is "farther" away, some performance enhancement may still be provided, but the maximum will be limited by the insufficient TCP window size between the endpoint and the PEP. For maximum performance, the PEP causes the sender to provide enough data to fill both the sender-to-PEP(s) path and the PEP(s)-to-receiver path. When generating a preack for a packet received from the sender, the PEP performs a computation to determine the receive window size to place into the packet (i.e., the window size to advertise).

The window size computation takes a number of variables and parameters into account. One consideration is the total amount of buffer space that can be dedicated to this connection, since any advertised window implicitly promises an equal amount of dedicated buffering. Another factor is providing a window sufficient to ensure availability of data to the sending side of the PEP itself.

Alternative forms of window virtualization can be performed. The PEP could simply alter the contents of the advertised receive window as packets transited it. This could cause the advertisement of a larger window than the endpoint was actually offering. This might not be a problem, as the endpoint node might be capable of processing the data at a high enough rate to avoid overflowing. Since the endpoint is still acknowledging the receipt of the packets through the PEP, the PEP itself could monitor the inflow of data, holding up the transmission of packets that would overrun the window of the receiving endpoint. These packets could be stored locally until space became available at the receiving endpoint. Alternatively, the overflow packets could be dropped, eventually causing a retransmission. In either scenario, the PEP could monitor the rate that the receiving endpoint is absorbing data and limit the increase in the advertised send window so as to minimize overruns. Here, overruns would occur only when the receiving endpoint dramatically reduced the rate at which it was processing data.

Another optimization with respect to window sizing can be applied. As described above, many TCP implementations advertise a fixed window size for each TCP connection (actually a fixed maximum). However, TCP performance does not increase substantially when the window size is increased beyond the bandwidth delay product of the connection. Further, the advertised window size implies an equivalent reservation of system buffer memory. Thus, for connections with a bandwidth delay product less than the maximum window size, excess memory is reserved; while connections with a bandwidth delay product exceeding the fixed maximum experiences performance loss. It can be seen then that a fixed maximum window size is, in general, either wasteful of memory or underutilizes available bandwidth or both. A solution to this problem is to have an advertised window size that more closely tracks the bandwidth delay product of the TCP connection. One implementation of this permits each endpoint to monitor its current throughput and adjust its advertised window size (and the associated buffering) accordingly. This can be accomplished by modifying the endpoint implementation.

Another method leaves the endpoint implementation intact, but sets a relatively small fixed window size and uses a PEP, located within the bandwidth delay product range of the small window size, to provide the monitoring required to adjust the window size accordingly. The PEP can optimize the window size of each individual connection so as to better utilize buffer memory.

Recongestion

Another PEP algorithm is recongestion. The standard TCP congestion avoidance algorithms are known to perform poorly in the face of certain network conditions, including: large RTTs, high packet loss rates, and others. When the PEP detects one of these conditions, it intervenes, substituting an alternate congestion avoidance algorithm that better suits the particular network conditions.

This PEP algorithm uses preacks to effectively terminate the connection between the sender and the receiver. It then resends the packets from itself to the receiver, using a different congestion control algorithm. For maximum performance, the PEP should be located near the sender, as the connection between the sender and the PEP may serve to limit overall performance.

Recongestion algorithms are dependent on the characteristics of the TCP connection. An optimal algorithm for large RTT connections may perform poorly in a small RTT environment. The PEP monitors each TCP connection, characterizing it with respect to the different dimensions, selecting a recongestion algorithm that is appropriate for the current characterization.

Local Retransmission

Another reason for implementing preacks is to prepare to transit a high-loss link (e.g., wireless). In these cases, the preacking PEP is located most beneficially "before" the wireless link. This allows retransmissions to be performed closer to the wireless link, removing the retransmission burden from the remainder of the network.

Figure 8A:
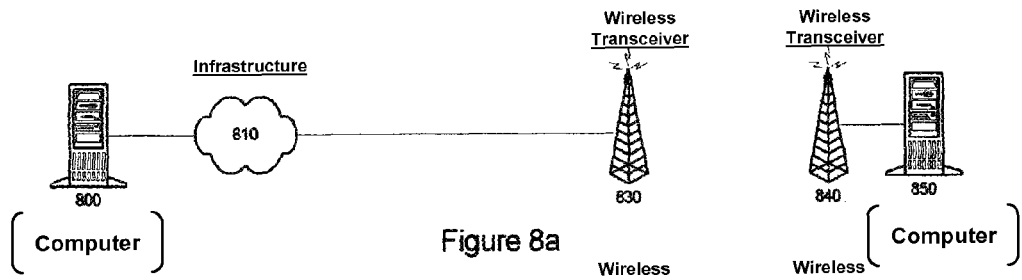
FIG. 8a depicts a common network configuration utilizing one wireless link.
Figure 8B:
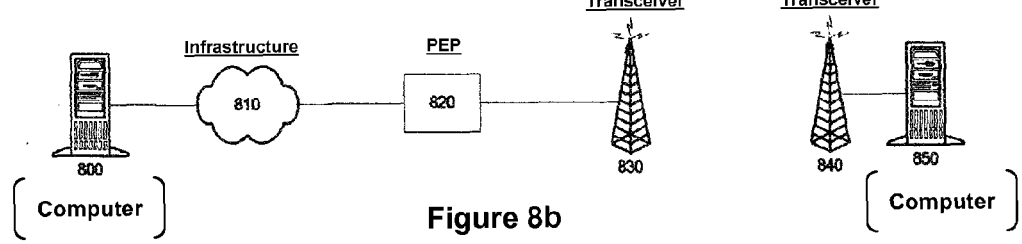
FIG. 8b shows the system of FIG. 8a augmented with a PEP.
Figure 9:
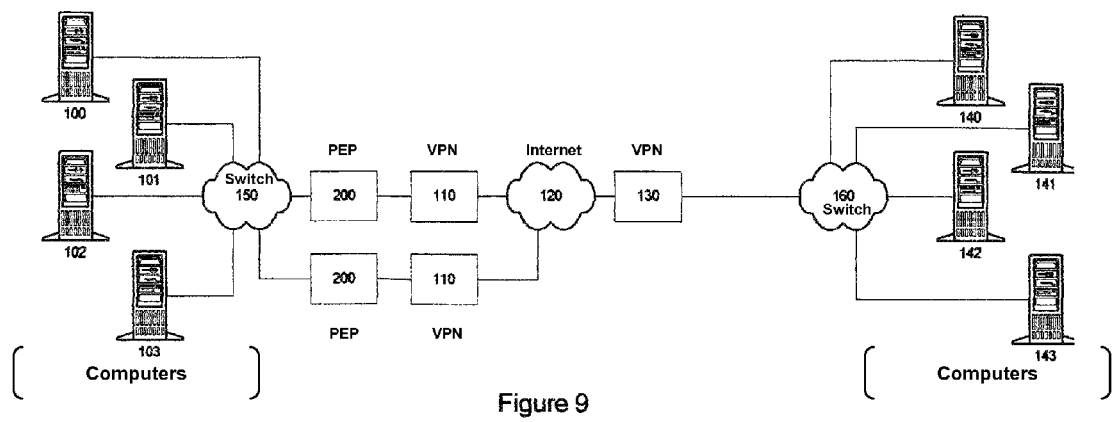
FIG. 9 depicts another embodiment of a system augmented with a PEP.

FIG. 8a depicts a common network configuration utilizing one wireless link. Computer 800 is connected to routing and switching infrastructure 810. One node of infrastructure 810 is wireless transceiver 830, which communicates with wireless transceiver 840, which is connected to computer 850. Packets from computer 800 destined for computer 850 are forwarded, by infrastructure 810, to transceiver 830. Transceiver 830 broadcasts the packets, which are received by transceiver 840, which sends them to computer 850. Packets from computer 850 to computer 800 travel the reverse route. If a packet is corrupted during the wireless transmission and reception phase, it is dropped by transceiver 840. Computer 800 will detect the loss of the packet using any of the standard TCP techniques for detecting dropped packets (dupacks and selective acknowledgements), and will retransmit accordingly. FIG. 8b shows the system of FIG. 8a augmented with PEP 820. Packets sent between transceiver 830 and infrastructure 810 transit the PEP and may be modified according to any PEP algorithms that are enabled.

PEP 820 may provide local retransmission, in which case, packets dropped due to failures of the wireless transmission process are retransmitted directly by PEP 820. This is advantageous because it eliminates the retransmission burden upon computer 800 and infrastructure 810. Further, it is often the case that the bandwidth of the wireless segment exceeds that of the slowest link within infrastructure 810. Without the PEP, the dropped packet would have to be retransmitted by computer 800, which would, according to standard TCP/IP congestion avoidance algorithms, reduce its bandwidth by one-half, resulting in poor overall transmission rates. With PEP 820 providing local retransmissions, the dropped packet can be retransmitted across the wireless link without necessitating a retransmit by computer 800 and a corresponding decrease in the rate of data transmission from computer 800 (since, in this case, the wireless link has greater bandwidth than the current transmission rate—likely the bandwidth differential is sufficient to retransmit the packet several times without requiring a pause in data transmission from the source).

Repacketization

As described above, TCP performance is proportional to packet size. Thus increasing packet sizes improves performance unless it causes substantially increased packet loss rates or other nonlinear effects, like IP fragmentation. In general, wired media (such as copper or fibre optics) have extremely low bit-error rates, low enough that these can be ignored. For these media, it is advantageous for the packet size to be the maximum possible before fragmentation occurs (the maximum packet size is limited by the protocols of the underlying transmission media). Whereas for transmission media with higher loss rates (e.g., wireless technologies such as WiFi, etc., or high-loss environments such as power-line networking, etc.), increasing the packet size may lead to lower transmission rates, as media-induced errors cause an entire packet to be dropped (i.e., media-induced errors beyond the capability of the standard error correcting code for that media), increasing the packet loss rate. A sufficiently large increase in the packet loss rate will actually negate any performance benefit of increasing packet size.

It is difficult for a TCP endpoint to choose an optimal packet size. Indeed, the optimal packet size may vary across the transmission path, depending on the nature of each link. By inserting a PEP into the transmission path, this situation can be improved. An intermediate PEP can repacketize data, (i.e., combine packets with sequential data into a smaller number of larger packets or break apart a sequence of large packets into a larger number of smaller packets). A PEP can monitor the link characteristics and adjust the transiting packet sizes through recombination to improve throughput.

A choice facing the PEP designer, when repacketizing, is how to handle ACKs to the sending TCP endpoint. One strategy is to do nothing (i.e., let the destination TCP endpoint generate ACKs—as it does normally—and allow these ACKs to propagate back to the originating TCP endpoint). This method's advantage is that there is no requirement that the ACKs be routed through the PEP. Hence, this option works regardless of the overall network topology (i.e., unrestricted). However, this method has other disadvantages. One disadvantage is that the sending TCP endpoint will be receiving ACKs for sequence numbers different than those that were sent. Although permitted by the TCP specification, this situation is unusual, increasing the risk that some TCP implementations will malfunction. Another disadvantage is that when a packet is dropped, the sending TCP may incorrectly recognize which packets require retransmission, ultimately requiring a timeout to regain synchronization and causing needless performance loss.

Another PEP implementation choice is to require full-duplex communications. In this case, the PEP can alter the returning ACKs and adjust the sequence numbers to match the original sending sequence. This requires the PEP to reproduce the original sequence number stream. One method of reproduction is to store the original sequence number sequence.

Saving only the original sequence number stream limits the performance gain that a PEP can achieve. Since the original data is not saved, only the TCP endpoint can retransmit any dropped data. But the retransmissions are performed only on the boundaries of the original packets, wasting network bandwidth due to the misalignment of the original and repacketized streams.

Another implementation choice is to save the original data stream. This choice allows increased efficiency in the handling of dropped packets as the PEP can supply the missing data exactly. Further optimization occurs because the retransmitted data does not consume bandwidth on the network links between the sending TCP endpoint and the PEP. Note that this is very similar to a preack situation. If the PEP implements preacks, then repacketization is easy to add.

Repacketization is beneficial for connections that move large amounts of data. However, it is injurious to connections that are latency sensitive (e.g., TELNET and others), as the PEP may wait for additional packets from the sender to constitute a full MTU packet, increasing the latency for transmission.

Dual PEP Algorithms

Another class of PEP algorithms is known as dual-PEP algorithms. Dual-PEP algorithms require the presence of two PEPs in the conversation. Typically, a dual-PEP algorithm is also a full-duplex PEP algorithm. A dual-PEP algorithm, similar to a VPN, operates by transforming the packets sent by a sender into another format. This intermediate packet format is sent from one PEP to the other PEP. The receiving PEP transforms the packet back into a format comprehensible to the receiver before forwarding it. Packet transformations are not limited to modifications of the payload. Dual-PEP algorithms may augment or modify protocol control fields, as well.

Figure 3:
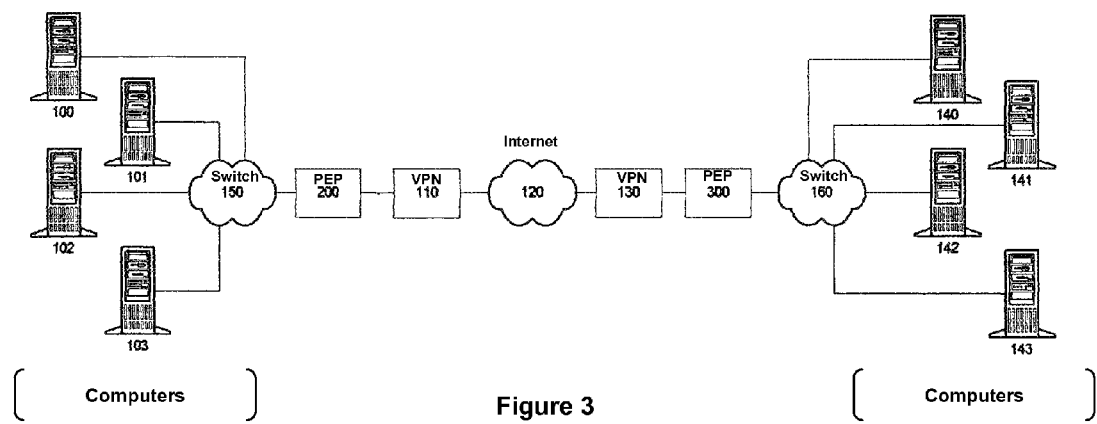
FIG. 3 depicts the Virtual Private Network of FIG. 1 augmented with two PEPs.

FIG. 3 depicts the addition of a second PEP 300 into the system of FIG. 2. This configuration allows the use of dual-PEP algorithms in communications between computer 100 and computer 140. In this configuration, the packets that flow between PEP 200 and PEP 300 may contain data that is not understood by either endpoint. However, through the use of standard TCP format packets, the transfer of these packets between the two PEPs is subject to the same operations as though the two PEPs were not present in the conversation (i.e., FIG. 1).

Compression

One example of a dual-PEP algorithm is compression, which boosts performance by transferring less data between the two participating PEPs. Two forms of compression are known, context-sensitive and context-insensitive. Context-insensitive data compression is applied to data without knowledge of the type of data. Context-sensitive compression utilizes knowledge of the data type to select a specific compression algorithm from a suite of suitable algorithms. In general, knowledge of the specific protocol is required to perform context-sensitive compression. A PEP can use TCP port numbers (i.e., well-known ports), as well as data from the connection itself to determine the appropriate compression algorithm to use. Some protocols use only a single type of data, requiring only a single compression algorithm that can be selected when the connection is established. Other protocols contain different types of data at different times. For example, POP, IMAP, SMTP, and HTTP all move files of arbitrary types interspersed with other protocol data. Knowledge of the data type and. in most cases, permission from the user are required to use a lossy compression algorithm. Otherwise, only lossless compression algorithms can be employed safely. Compression is not limited to the protocol payload. The control fields of the protocol itself may be compressed, using a completely different algorithm than that used for the payload.

Upper-Level Protocol PEPs

Some PEP algorithms are applied specifically to the upper-level protocol of a connection. These upper-level protocol-specific PEP algorithms analyze the conversation, typically on a transaction-by-transaction basis. Typical upper-level PEP algorithms include: caching, pre-fetching, post-writing, and others.

The UNIX Network File System (NFS) and The Common Internet File System (CIFS, also known as Server Message Block (SMB)) are well known file serving network protocols that may operate on top of TCP/IP. An upper-level PEP algorithm can apply many optimizations to TCP connections using these protocols.

Preferred Embodiment

Figure 4:
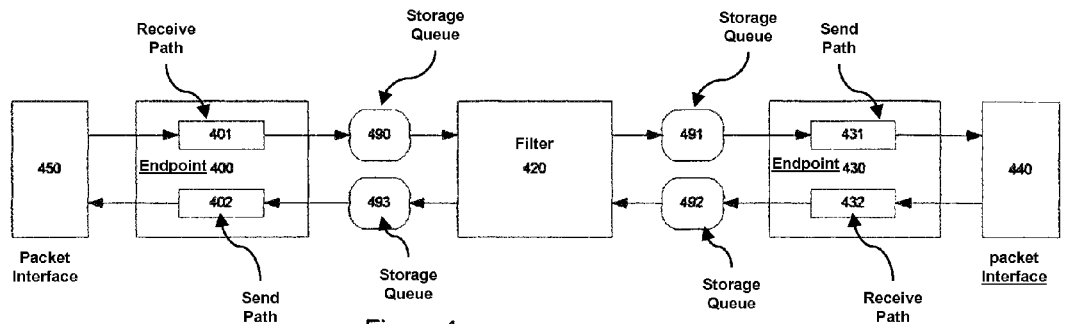
FIG. 4 shows the architecture of a PEP.

FIG. 4 shows the architecture of a preferred embodiment of a PEP. The depicted PEP is symmetrical, in that data can flow in either direction. For a first direction of data flow, packet interface 450 receives packets from a network and forwards them to endpoint 400. Endpoint 400, operating as described below, contains receive path 401, which delivers data to storage queue 490. Filter 420 removes data from storage queue 490 and processes it as described below. Filter results destined for the same data flow direction are placed into storage queue 491. Endpoint 430, containing send path 431, removes data from storage queue 491, packetizing it for delivery to a network via network interface 440.

Note that storage queue 490 may be required only for certain implementations of filter 420. Some implementations of filter 420 may not require retaining inbound data, in which case, the storage queue is unnecessary. Other implementations of filter 420 may provide storage within themselves, eliminating the need for the storage queue.

Similarly, for a second direction of data flow, network interface 440 provides packets to endpoint 430. Receive path 432 of endpoint 430 delivers data to storage queue 492. Filter 420 removes data from storage queue 492, placing results destined for the same direction into storage queue 493. Send path 402 of endpoint 400 removes data from storage queue 493, packetizing it for delivery to a network via network interface 450. Henceforth, this description will describe data flowing in the first direction. However, the reader will understand that the same description also applies to data flowing in the second direction, using the inverse direction elements, as described above.

Filter 420 is able to operate on both directions of data flow serially and simultaneously. For example, data removed from storage queue 490 may contain a command whose result is currently cached or can be internally generated. In this case, Filter 420 simply inserts the result of this operation into storage queue 493 for transmission back to the original requester, deleting the original request.

Once a connection has been established (i.e., after the special connection establishment processing described below), endpoint 400 provides some TCP upper-level behaviors and PEP algorithms. Receive path 401 is responsible for reconstructing the TCP data stream before placing it into storage queue 490. This requires that receive path 401 perform packet reordering. When out-of-order packets are received, as identified by their TCP sequence number, receive path 401 places them into an internal storage area until the missing packets arrive. As packets arrive, receive path 401 examines its internal storage area, delivering into storage queue 490 all of the data that has arrived in the correct order.

Receive path 401 of endpoint 400 provides preacking; when a packet arrives an acknowledgement is generated and sent using send path 402. Standard TCP delayed ACKs are supported as well as non-delayed ACKs. Flow control of the sender is provided by controlling the contents of the window field on acknowledge packets. The endpoint determines the value to place in the window field by subtracting the amount of data resident in this direction of the system (i.e., in storage queues 490 and 491, filter 420 and endpoint 430) from its estimate of the correct window size. This value is clipped to the maximum value of the window field in the packet (i.e., if the maximum window field of the ACK packet is insufficient to represent the computed value). The correct window size is computed from the running estimate of the RTT or, in an alternate embodiment, is simply a large constant. Optionally, the window size may be further limited when insufficient buffer memory is available. In steady state the window size is adjusted to maintain the rate of data ingress equal to the rate of data egress, as defined by any bandwidth allocation policy that may be present. Thus, the PEP provides fine-grained flow control, limiting the sender's rate without dropping packets and without forcing retransmissions.

Send path 491 of endpoint 430 provides multiple PEP algorithms for outbound data, including recongestion and repacketization.

Repacketization

Repacketization is performed by extracting data from storage queue 491 in full-sized packet amounts and sending those packets. When there is insufficient data in storage queue 491 to form a full-sized packet, send path 431 decides either to wait for more data to arrive or to send a small packet immediately. The send-or-wait decision involves several criteria. If the push flag (PSH) or urgent pointer has been set for the data in the send queue, then it is sent immediately. If neither of these is set, then the send path may choose to delay sending the data, opting to wait for more data to arrive in storage queue 491. If additional data has not arrived within a short period, then the remaining data is sent even though the packet is smaller than the maximum allowed. In a preferred embodiment, the PEP monitors the average time between the arrival of adjacent non-MTU sized packets. When the arrival time is less than a constant, repacketization is enabled. When the arrival time is greater than a constant, repacketization is disabled. In a preferred embodiment, the constant is 0.2 seconds, approximately the same as the maximum amount of time that the PEP waits before sending a non-full MTU sized packet.

The repacketization algorithm is most effective when storage queue 491 continues to receive data at a rate sufficient to allow the sending of full-sized packets. The window virtualization method of receive path 401 uses the occupancy of storage queue 491 as part of the criteria for controlling the sending rate of the TCP sender, filling storage queue 491 so as to allow maximum-sized packets to be sent by send path 431 as much as possible.

Path MTU Discovery

An important part of the repacketization algorithm is the handling of path MTU (PMTU) discovery. RFC 1191, herein included by reference, contains a description of the IETF-recommended algorithm for PMTU discovery. The repacketization algorithm needs to know the PMTU to the receiver.

There are two methods for handling PMTU discovery within a PEP using the standard IETF methods: piggy-backed and autonomous.

In the piggy-backed method, the PEP relies on the sending TCP to perform PMTU discovery, observing the results and reacting accordingly. When a packet is received by receive path 401 with the don't fragment bit (DF) set, this flag is carried through the PEP and placed onto a corresponding packet sent by send path 431 (Having the DF flag set on a packet temporarily inhibits the repacketization algorithm, so that a packet larger than the current MTU can be transmitted). This packet will either reach the destination, in which case it represents a candidate for a new PMTU size, or an ICMP error packet will be received. Upon reception of this error packet, the PEP knows that the new proposed PMTU size is not valid for send path 431 and that it must retain the old PMTU size. Reception of the ICMP error message also indicates that the large PMTU packet was dropped, so the PEP retransmits it. Of course, normal TCP behavior will also cause this packet to be retransmitted, so special handling of this ICMP-induced retransmission case by the PEP is optional. The ICMP packet is not forwarded back to the TCP sender. By failing to forward the ICMP packet, the TCP sender will use the new PMTU in its communications with the PEP.

This is a typical case whereby a computer on a LAN communicates with another computer via the WAN (VPN or through a router). Often, the PMTU for the LAN segments is larger than that for the WAN segments. By suppressing the PMTU error packet (ICMP), the TCP sender is allowed to use the larger packet size for this connection, achieving improved network efficiencies for the LAN, TCP sender, and PEP as fewer, larger packets are processed for the same data transfer rate.

In the autonomous method, the PEP itself initiates PMTU discovery. The PEP creates a proposed new PMTU (larger than the current PMTU for the connection). Transiting data is repacketized to the larger PMTU and the DF flag is set on these packets. The PEP waits for the return of an ICMP error packet. Upon receipt of the error packet, the proposed larger PMTU is known to be invalid and a smaller value is used. If, after a suitable period, there is no error, then the PEP knows that the new larger PMTU is acceptable. Alternately, an ACK of the larger-sized packet signals acceptance of the new PMTU size.

The piggy-back method cannot be relied upon completely to optimize the PMTU of all paths in the connection. For example, referring to FIG. 3, assume that the PMTU of the segments comprising internet 120 have the smallest PMTU and further assume that PEPs 200 and 300 utilize only the piggy-back method. PMTU discovery initiated by computer 100 to computer 140 properly will discover that computer 100 can send large packets to PEP 200. PEP 200 properly will repacketize to the smaller PMTU of internet 120. However, PEP 300 will fail to recognize that it can repacketize from the smaller, inbound PMTU of internet 120 to a larger PMTU for transmission to computer 140. Only if PEP 300 uses the autonomous PMTU discovery method for data sent to computer 140 will the larger MTU size be discovered. Alternately, PEP 300 must wait for computer 140 to initiate PMTU discovery to enable the larger-size packets, however, this only operates correctly when it is known that the two directions are symmetric.

It is known that the standard algorithm for PMTU discovery does not work in all configurations, due to the blocking of the returning ICMP messages in many interior nodes, such as firewalls, etc. In these situations, the sender must notice that all packets are dropped after attempting to increase the MTU. After a suitable timeout, the sender lowers the MTU and suspends the PMTU discovery algorithm. Note that the blocking of the ICMP error packet in the piggy-backed PMTU mode described above does not cause failure of the standard PMTU discovery algorithm, as the larger packets are ACKed to the sender.

A dual-PEP algorithm performs reliable PMTU discovery between PEPs for TCP connections in a more efficient manner than that described in the IETF's RFCs. As with the standard PMTU discovery algorithm, the sender periodically probes for a larger MTU. The sending PEP computes a new proposed PMTU size (larger than the current PMTU and no greater than the MTU of the initial network segment) and repacketizes to the larger size. Unlike the standard algorithm, fragmentation is not prohibited for these larger packets (i.e., the DF flag is left off). The receiving PEP observes the arrival of packets. If the receiver detects the arrival of a fragmented packet, then the receiver reports back to the sender that fragmentation is occurring, by marking the ACK packet that is generated for the received packet. There are several options for marking the packet to indicate to the sender that fragmentation is occurring. One option is to use an unused bit in the TCP header flags field. Another option is to use a TCP option. A third option is to mark the IP header of the packet (i.e., IP Header Option, or some of the other underutilized fields like TOS).

When the sender detects the marking on a packet, it knows that fragmentation is occurring. The proper response to a fragmentation indication depends on whether the sender actively is engaged in PMTU discovery. If the sender is not engaged in PMTU discovery, then this indicates a reduction in the PMTU, causing the sender to initiate active PMTU discovery to adapt to the new smaller size. If the sender actively is engaged in PMTU discovery, then the receipt of a fragmentation indication informs the sender that it has exceeded the PMTU, leading to the suspension of the PMTU discovery algorithm.

The active PMTU discovery algorithm operates by increasing the MTU of transmitted packets until a fragmentation indication is received, signaling that the PMTU has been exceeded. Because of the time lag between the sending of a larger packet and the reception of the ACK for it, as well as the use of cumulative ACKs, the PMTU discovery algorithm operates with imprecise information. In a preferred embodiment, the PMTU discovery algorithm increases the size of packets slowly, so as to reduce the uncertainty. The PMTU for a connection is increased by a few percent once for every RTT that elapses without a fragmentation indication. In a preferred embodiment, the sequence number of the first packet with an increased RTT is recorded. If that sequence number is ACKed without a fragmentation indication (either specifically or cumulatively), then the algorithm assumes that the PMTU for that packet is acceptable and increases it, again recording the sequence number. Upon receipt of a fragmentation indication, the algorithm undoes the last increase in the PMTU and suspends itself until the next time that PMTU discovery is initiated (either due to elapsed time or a fragmentation indication). By sending all packets within an RTT at the larger packet size, the uncertainty of cumulative ACKs is nearly eliminated.

If the PMTU algorithm is initiated due to the unexpected receipt of a fragmentation indication, then it immediately reduces the PMTU (in a preferred embodiment, by one-half of the current size, but no less than the minimum MTU for IP networks) before beginning to search for the new maximum PMTU.

This algorithm is more efficient than the standard algorithm since no packets are dropped. At worst, performance degrades due to the requirement that interior nodes perform IP fragmentation. This load is generally negligible, as the PMTU tends to remain unchanged for long periods of time, allowing the period between activations of PMTU discovery to be large, resulting in only a slight load.

The PMTU applies to a packet flow, not to individual connections. This allows further optimization as the algorithm can apply its results to all connections that are part of the same flow and need be activated only once for the entire flow.

Recongestion

Due to the preacking behavior of receive path 401 and send path 402, send path 431 must provide its own flow control and congestion-avoidance behavior. One option is to utilize the standard TCP congestion with the additive increase, multiplicative decrease behavior described by RFC 2581, herein incorporated by reference. However, any other congestion-avoidance algorithm can be used.

Connection Establishment

TCP Connection establishment packets (SYN packets and the associated ACKs) require special handling. Firstly, SYN packets cannot always be preacked. To preack a SYN packet, the PEP must know in advance that the TCP connection will be established. If the PEP were to preack the SYN packet and the connection could not actually be established, then the connection would be reset after it appeared to the application program to have opened successfully. This would likely cause failures in the application program, as many programs are prepared to handle a failure to open a connection, but are not prepared to handle a reset of a connection after it appeared to open successfully. Alternately, having the connection reset after an apparently successful open may induce recovery behavior in the application that is inappropriate or erroneous when the actual problem is a failure to connect. Of course, if the PEP knows that the connection is certain to open, then it could preack SYN packets just like regular data packets. In the case when the PEP is not ready to guarantee successful opening of the TCP connection, it suppresses preacking of those SYN packets. Since preacking is suppressed, the originating TCP endpoint remains responsible for retransmission in case the packet is dropped. Also, an ACK-only packet that is received by a receive path (401 or 492) that is acking a SYN must not be dropped, as it would be for normal preacked data transmissions. Instead, it is forwarded through the PEP to the corresponding send path to complete the opening of the connection.

Secondly, the PEP alters the connection initiation options contained in a SYN packet. By altering the connection options, the PEP is able to utilize optional TCP capabilities that may be supported by only one of the two endpoints, gaining the benefit of the option without requiring both endpoints to support the option. Also, the PEP may insert additional options in an attempt to probe for the existence of other PEPs elsewhere in the connection, allowing the application of dual-PEP algorithms and the identification of flows. In a preferred embodiment, a PEP adds to a SYN packet a token, uniquely identifying the PEP instance. This unique token could be an IP address, a MAC address, a Globally Unique Identifier (GUID), a random number, a machine name, an assigned number, or others. Upon receipt of a SYN packet with an identifying token a PEP can determine the flow for the connection. Referring to FIG. 3, SYN packets transferred between computer 100 and PEP 200 control the TCP conversation between them. Modified SYN packets exchanged between PEPs 200 and 300 control the conversation between them. Finally, modified SYN packets exchanged between PEP 300 and computer 140 control their conversation.

Referring to FIG. 4, receive path 401 receives a SYN packet, noting the connection options contained therein. These are retained for use by send path 402. Receive path 401 forwards the SYN packet to send path 431 for transmission. Send path 431 alters the connection options to include optional features that it supports (e.g., window scaling, selective acknowledgement, etc.). One or more additional TCP options can be included to offer dual-PEP algorithms, such as compression, CIFS server side caching, etc. The altered packet is sent by send path 431.

Later, an answering SYN packet is received by receive path 432. By examining the options contained therein, receive path 432 determines which TCP options and PEP algorithms will be enabled for itself and send path 431. This answering SYN packet will, of course, be forwarded for transmission by send path 402. However, send path 402 alters the SYN packet's options to respond to those decoded by receive path 401.

Thus, the reader can see that two separate TCP option negotiations are performed, resulting in two different sets of TCP options being enabled. This allows the system to obtain the benefits of these TCP options without requiring the modification of all of the endpoints. For example, assume that the TCP implementation of computer 100 does not support window scaling and that the TCP implementation of computer 140 does support window scaling. In the absence of a PEP (i.e., FIG. 1), the window-scaling option is not enabled, resulting in a limitation on TCP performance when the bandwidth delay product between the two computers exceeds the maximum standard TCP window size of 65,535 bytes. However, when the PEP is present (i.e., FIG. 2), only the communication between computer 100 and PEP 200 is subject to the unscaled TCP window-size limitation, as the communication between PEP 200 and computer 140 enables window scaling.

Further, a different congestion-avoidance algorithm (more suited to long RTT links) can be employed for the PEP 200 to computer 140 link, even if neither computer 100's nor computer 140's TCP endpoint implementation supports it.

In the dual-PEP system of FIG. 3, there are three sets of TCP connection options that become enabled. The first set is between computer 100 and PEP 200. The second set is between PEP 200 and PEP 300. The third set is between PEP 300 and computer 140. When PEP 200 forwarded its connection initiating SYN packet received from computer 100, it altered the TCP options to include a TCP option that allowed PEP 300, upon receipt thereof, to determine that dual-PEP algorithms could be enabled between PEP 200 and PEP 300. PEP 300, upon forwarding the answering SYN received from computer 140 to PEP 200, alters the TCP options to indicate the support of dual-PEP algorithms. Thus dual-PEP algorithms are enabled in the PEP 200 to PEP 300 segment of communication without requiring any modification of the endpoint TCP implementations.

In a preferred embodiment, if a connection has three PEPs deployed along it, then by utilizing the SYN-based connection information described above, the PEP in the middle discovers that there are PEPs on both sides of the connection. A PEP-in-the-middle can suppress its own application of certain dual-PEP algorithms (for example, data compression and others), leaving the PEPs on either end of the connection to shoulder the burden of these algorithms, while the middle PEP merely passes the data through itself. The PEP in the middle need not be bypassed entirely, repacketization and recongestion algorithms may be still be applied profitably, depending on the specific network topology.

Filter Operations and Algorithms

In a preferred embodiment, filter 420 allows upper-level protocol enhancements. Any protocol based on TCP can have a filter that provides protocol-specific optimizations. Filters are not limited to a single TCP connection, some upper-level protocols actually consist of multiple TCP connections as well as UDP-based protocols, all of which can be handled by filter 420.

A filter operates by reconstructing the transactions of a protocol and optimizing them at the transaction level. Typical optimizations include: caching, pre-reading, post-writing, prediction, and others. Generally, optimizations are focused either on reducing the total amount of bandwidth used by eliminating redundant operations or on reducing latency in large RTT environments.

In the case of remote file access protocols, such as NFS and CIFS, there are several optimizations that can be performed to reduce the latency of accesses. It is well known that most file accesses are sequential, thus when the filter detects that a file is being read in a sequential manner, it issues operations to speculatively read multiple blocks from the server, ahead of their having been requested.

The filter must provide a consistent view of the file data being read. As with any data-retaining proxy, several well-known rules must be followed to ensure consistency. For example, write traffic to a file must either invalidate or update any pre-read data for the same file. Beyond the standard rules, the filter provides additional speculative read-ahead rules, as follows. In the CIFS case, the filter tracks the usage of opportunistic locks, allowing it to detect when the file might be volatile (i.e., capable of being altered by another agent), and suppressing the read-ahead optimization in this rare case. In the NFS case, the filter is careful to ensure that any read ahead is limited to retaining its data for a short amount of time (unlike a cache, which might retain the data for a substantial period), typically no more than one or two RTTs. This short duration of data retention is sufficient to ensure the consistent behavior of a well-formed application, since every read operation already views the file data at least one-half RTT out of date. The number of blocks read ahead is controlled by a combination of the available memory and bandwidth resources, as well as the RTT. Usage of the RTT in the computation of the read ahead amount optimizes use of PEP memory, while simultaneously allowing maximum bandwidth. File system meta-data can be read ahead just like blocks of an individual file, accelerating many operations, such as file enumeration, file name searching, etc.

For write-behind optimizations, many of the same issues apply. Read operations issued after a write behind must be consistent when viewed through the write activity. However, write behinds represent volatile data that must be retained even in the face of a system failure. Nevertheless, there are many optimizations that can be performed for write operations. Firstly, most file servers allocate storage space only when needed for a write operation. The storage allocation operation can take substantial time and tends to be erratic in its performance. The PEP, upon detecting a sequential write situation, forces the file server to pre-allocate storage ahead of the actual write operation. This improves performance by reducing the time needed for the server to complete the write operation itself. Also, by forcing a prallocation of the storage, the PEP is able to provide an accurate out-of-storage error response to a posted write operation. Secondly, for most file types, the PEP can provide a small amount of posted-write capability, without impacting correctness in the face of a system failure.

Open files can have their meta-data prefetched. By observing the pattern of access to meta-data for a file, the PEP can prefetch meta-data specutively when a file is opened.

Beyond file-level optimizations, a PEP can also provide directory-level optimizations. One directory-level optimization is known as open ahead. When a PEP detects a pattern in the opening of files in a directory, (e.g., directory enumeration, directory copy, copy all files of type 'x', etc.), it can open the next file in the sequence specutively. The open ahead must be done with attributes that are gleaned from the original sequence, so that it is a compatible open. Some-file sharing protocols provide some form of wild-card directory searching operation. The PEP retains the results of these operations and uses them to control the open-ahead optimization. Another directory-level optimization is meta-data prefetching. With meta-data prefetching, the PEP prereads file meta-data speculatively in anticipation of need. Again, by retaining the data for only a short time, no additional consistency problems are created.

There are additional optimizations specific to the CIFS protocol, such as file locking. Current implementations of the CIFS protocol often do not recognize that multiple accesses to the same file from the same source system do not necessarily constitute a need to demote an opportunistic lock from exclusive to shared. By tracking the usage of a file, a filter can retain an opportunistic lock, even when the requesting client has multiple opens of the file.

Another class of optimization is file open and close. Often, an application will open a file, close it, and reopen it almost immediately. The filter can optimize this behavior by suppressing the close of a file for a short time, in hopes that a subsequent open can eliminate a round trip to the file server. Even though the close is suppressed, the filter has the option to optionally update the meta-data immediately, so that the information is not lost in case of a failure. If a short period elapses and the file is not reopened, then it is closed completely.

No matter how carefully conditioned, there is always the possibility that a speculatively issued operation ultimately is unneeded, wasting the associated bandwidth. The PEP limits this waste by constraining the issuance of speculative operations, based on the availability of unused bandwidth. Speculative operations are issued only when sufficient network bandwidth is available. To determine if network bandwidth is available, the filter examines both outgoing bandwidth (i.e., the request) and incoming bandwidth (i.e., the response). The availability of bandwidth may be controlled not only by unused bandwidth on the packet interfaces, but also by internal estimates of the available bandwidth between two communicants, as well as any policy restrictions that may be present. When deployed in an interior node such as a VPN gateway, the PEP may include the bandwidth of all of the connections transiting it in its calculations.

Packet Interfaces and Deployment Scenarios

As described above, one PEP embodiment is a stand-alone network node. In this case, packet interface 440 and 450 would be actual hardware elements (NICs) that interface directly to a network. In one embodiment, there are two, physically separate NIC cards, one each for packet interfaces 440 and 450. This allows deployment "in line", which is shown in FIGS. 2 and 3. One advantage of this configuration is that the PEP need not have an IP network address and the network elements outside of the PEP need not even be aware of its existence. Though, as stated before, it may be desirable to provide a network address to the PEP for the purposes of monitoring and controlling it through the network itself. The PEP simply processes all packets received at one packet interface and sends them out the other interface. Packets with unrecognized or unhandled protocols simply are forwarded to the opposite side without further processing. Another advantage is that the PEP itself need not perform any type of routing function, reducing the latency of packets transiting the PEP.

Figure 6:
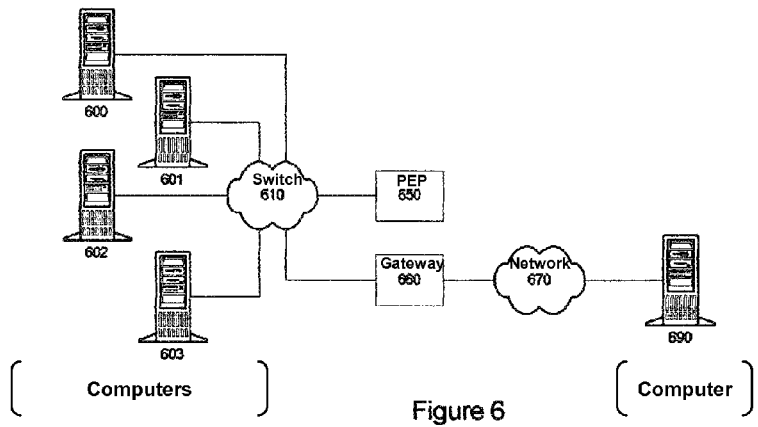
FIG. 6 shows the architecture of a system using a PEP with only one physical connection to the network.

In an alternate embodiment, packet interface 440 and 450 could be a single hardware instance that connects to a network at a single point. This is a difficult topology, as the network must be able to route packets into and out of the single network interface without changing the IP addresses of the packets. In an IP networking environment, this can be done by use of the gateway capability of IP routing. FIG. 6 depicts this configuration. Computers 600-603 (computer 600 henceforth) communicate using switch 610. Packets sent from computer 600 to computer 690 are processed as follows: Computer 600 uses its routing tables to locate the gateway for packets destined for computer 690; this gateway has been configured as PEP 650 (in this case PEP 650 must have an IP address on the local sub-net). PEP 650 receives the packet from computer 600, processing it through the PEP algorithms as described above. The IP gateway for PEP 650 is set to gateway 660 and the processed packet is forwarded to it. Gateway 660 forwards the packet through network 670 to computer 690. Packets originating at computer 690 and destined for computer 600 are handled as follows: The packets arrive at gateway 660, whose routing tables direct them to PEP 650. PEP 650 processes the packets and forwards them to computer 600. This configuration does not require that the PEP be on the same sub-net as the endpoint. The same configuration applies equally if computer 600 is a gateway to another network.

Figure 5A:
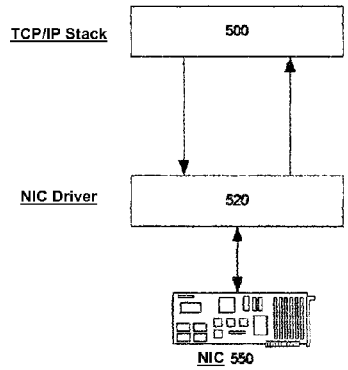
FIG. 5a shows the architecture of a TCP endpoint.

As described above, a PEP can be deployed within an endpoint node. FIG. 5a shows a common structure for the implementation of a TCP endpoint. TCP/IP stack 500 communicates with NIC driver 520, which in turn operates NIC 550. The application program (not shown) sends data to TCP/IP stack 500. The stack 500 creates the appropriate packets and sends them to NIC driver 520. NIC driver 520 operates the hardware of NIC 550, causing the packet to be sent to the network. Packets received from the network by NIC 550 are retrieved by NIC driver 520 and sent to stack 500, for processing by the endpoint. Stack 500 delivers data to the application as it becomes available.

Figure 5B:
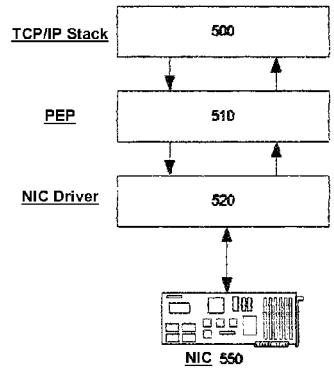
FIG. 5b shows the architecture of a TCP endpoint augmented with a PEP.

FIG. 5b shows the deployment of a PEP within this endpoint. PEP 510 is inserted between NIC driver 520 and stack 500. This style of insertion is typically known as a "shim". The connection between PEP 510 and stack 500 serves as one of the packet interfaces 440 or 450, and the connection between PEP 510 and NIC driver 520 serves as the other interface. One benefit of this mechanism is that the PEP is able to leverage certain facilities already implemented in stack 500. For example, the address resolution protocol (ARP), used to translate IP addresses into MAC addresses, need not be implemented in PEP 510, as the existing implementation in stack 500 will provide the MAC address with every packet. The PEP need only extract and utilize these addresses instead of implementing the complete ARP.

Figure 7A:
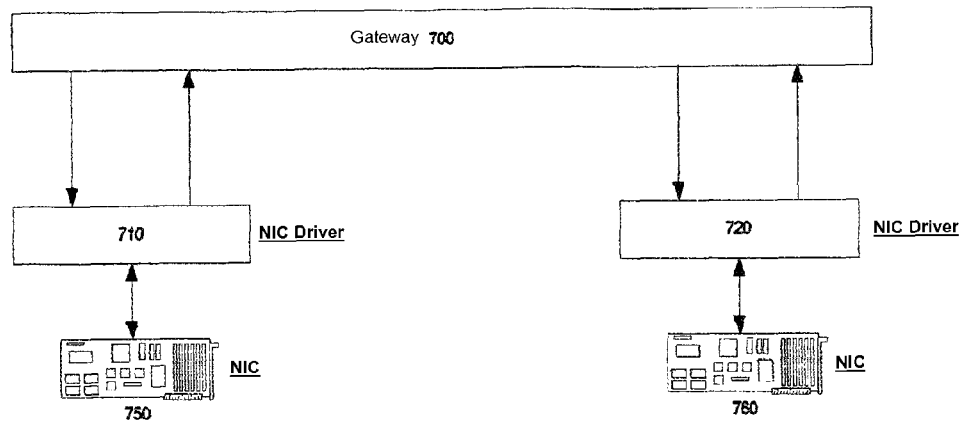
FIG. 7a shows the architecture of a gateway.

FIG. 7a shows diagram of a gateway. NIC drivers 710 and 720 operate NICs 750 and 760. Packets received by NIC 750, as operated by NIC driver 710, are sent to gateway 700, which in turn forwards them to NIC driver 720 for transmission by NIC 760, modifying them as needed. Likewise, packets received by NIC 760, as operated by NIC 720, are sent to gateway 700, which in turn forwards them to NIC driver 710 for transmission by NIC 750, modifying them as needed.

Figure 7B:
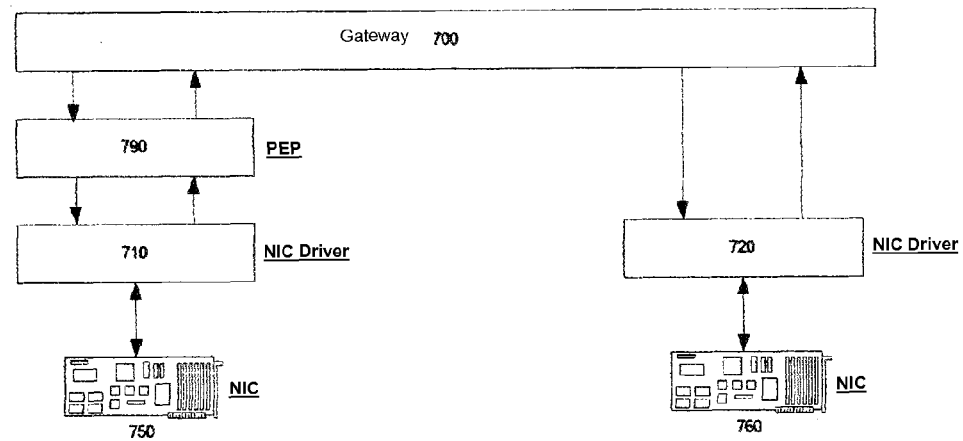
FIG. 7b shows the architecture of a gateway augmented with a PEP.

FIG. 7b shows the addition of PEP 790 to one side of the gateway. If this is the LAN side of a VPN gateway, then it has access to packets prior to any cryptographic protection added by gateway 700, allowing a large number of PEP algorithms to be employed.

Cryptographic NICs

A new class of NIC has been developed recently, the crypto-NIC. The crypto-NIC provides acceleration for the encryption and authentication of data packets for standard protocols, such as IPSec. Deployment of these cards has caused architectural changes in the operating system interface between protocol stacks, such as TCP/IP and NIC drivers. Modern operating system driver interfaces allow the protocol stack to interrogate the NIC driver to detect the presence of support for one or more of the cryptographic protocols. A crypto-NIC responds with a list the cryptographic algorithms that are supported, causing the protocol stack to direct the NIC to apply its cryptographic algorithms to packets as they are processed. Most crypto-NICs only provide bulk packet processing and do not provide any of the key distribution processing, leaving the protocol stack to perform this operation. The protocol stack provides the crypto-NIC with the cryptographic keys which have been allotted or negotiated by the key processing, allowing the crypto-NIC to properly apply the cryptographic algorithms for both sending and receiving packets. In this case, the communications between the protocol stack and the crypto-NIC are clear-text packets.

This situation creates an opportunity for the shim implementation of a PEP, whether a crypto-NIC is present or not. In the shim implementation of a PEP, the upper-level packet interface exports to the protocol stack the same software interface as a NIC. In a preferred embodiment, the shim responds to the protocol stack as though it were a crypto-NIC, returning a list of all implemented cryptographic capabilities when asked to do so. Hence, the protocol stack will assume that the PEP is a crypto-NIC and will provide it with cryptographic keys, expecting it to perform cryptographic operations on the packets. Thus, the PEP is able to operate on clear-text packets even in the presence of strong cryptographic protections. If there is no crypto-NIC present in the system or if the existing crypto-NIC doesn't support a particular cryptographic algorithm, then the PEP must provide the algorithms that it has indicated support for. However, if a crypto-NIC that supports the selected algorithms is present in the system, then the PEP uses it through the NIC driver, just as if it was the protocol stack itself.

When deployed in a shim configuration within an endpoint whose operating system supports crypto-NICs, the PEP is able to operate on clear-text packets, providing all PEP algorithms. Further, in this situation, no modification to the security policies is required. Communications leaving the endpoint remain at the same level of security as without the PEP.

When the present invention is used on the WAN side of a VPN as a shim, it utilizes the crypto-NIC operating system interface to gain access to the packets, independent of the presence of a crypto-NIC. In particular, it has access to the clear text of each packet and can perform all PEP operations normally prohibited when presented with the cipher-text version, which would be required if connected outside of the endpoint.

PEP NAT

PEP algorithms are not limited to optimizing connections. A PEP can also provide network address translation (NAT) as documented in RFC 1631, herein incorporated by reference. In a preferred embodiment, a PEP can create a "shadow" IP address, importing the presence of a system with an IP address on one side of the PEP onto the other side of the PEP. For example, referring to FIG. 2, assume that computers 100-103 are all on a common sub-net and that the PEP 200 has been configured to import computer 141 onto that sub-net. A shadow IP address from the sub-net of computers 100-103 is assigned to the import and configured into PEP 200. PEP 200 responds to address resolution protocol (ARP) requests and identifies its packet interface as the home for the shadow IP address, causing packets for that IP address to be sent to PEP 200 (no modification of the gateway address or routing tables is required in this case), Upon receiving packets destined for the shadow IP address, PEP 200 edits the packets using the techniques in RFC 1631, directing them to computer 141. Edited packets are processed through the PEP like other packets and are forwarded to gateway 110. Returning packets are processed similarly.

Flows

In a preferred embodiment, the PEP assigns TCP connections to flows. If the SYN packet exchange identifies a PEP on the other side of the connection, then the TCP connection is assigned to a flow for that PEP. In the case where there are multiple PEPs along a route, the last PEP is used as the end of the flow.

The PMTU of a flow is used by the repacketization algorithm for all connections assigned to that flow. Further, PMTU discovery need be performed only on one of the connections within a flow. When a new connection is established that has been assigned to a preexisting flow, the recongestion algorithm can use the flow information to provide substantially faster initial throughput than the standard TCP slow start algorithm. The flow can retain bandwidth and RTT information, allowing recongestion and bandwidth allocation algorithms to operate across the connections within the flow. Furthermore, when x-duplex detection is performed for a connection, the same assumptions can be applied to all of the connections applied to the same flow. Also, by collecting x-duplex information across all of the flows, the probabilistic x-duplex algorithms will reduce false error rates.

We claim:

1. A method for performing by a proxy discovery of a maximum transmission unit of a path between a client and a server, the method comprising:
    (a) increasing, by a first proxy, a size of a path maximum transmission unit (PMTU) by a predetermined amount for transmitting network packets between a client and a server via the first proxy;
    (b) repacketizing, by the first proxy, network packets received from the client for transmission to the server into packet sizes in accordance with the size of the PMTU;
    (c) determining, by the first proxy, a first network packet of the repacketized network packets with a round trip time greater than a previous round trip time for networks packets transmitted to the server; and
    (d) increasing, by the first proxy, the size of the PMTU by the predetermined amount responsive to receiving an acknowledgement for the first network packet without a fragmentation indication.

2. The method of claim 1, wherein step (a) further comprises increasing, by the first proxy, the PMTU in response to not receiving an indication of fragmentation from a second proxy within a predetermined time period.

3. The method of claim 1, wherein step (c) further comprises recording a sequence number of the first network packet with the round trip time that is greater than the previous round trip time.

4. The method of claim 3, wherein step (d) further comprises determining by the first proxy that the acknowledgement was received for the recorded sequence number.

5. The method of claim 1, wherein step (b) further comprises transmitting, by the first proxy, to the server network packets from the client repacketized in accordance with the size of the PMTU.

6. The method of claim 1, further comprising receiving, by the first proxy, an indication of fragmentation from a second proxy.

7. The method of claim 6, further comprising undoing, by the first proxy, a last increase in the size of the PMTU in response to receiving the indication of the fragmentation from the second proxy.

8. The method of claim 1, wherein step (b) further comprises identifying, by the proxy, that the repacketized packets are not prohibited from being fragmented.

9. The method of claim 1, further comprising receiving, by a second proxy, the repacketized packets transmitted from the first proxy and determining whether fragmentation has occurred.

10. The method of claim 1, wherein step (a) further comprising increasing, by the first proxy, the size of the PMTU by the predetermined amount for each round trip time in which an indication of fragmentation is not received by the first proxy.

11. A system of proxies performing discovery of a maximum transmission unit of a path between a client and a server, the system comprising:
    a first proxy deployed within a first computing device increasing a size of a path maximum transmission unit (PMTU) by a predetermined amount for transmitting network packets between a client and a server via the first proxy and the first proxy repacketing network packets received from the client for transmission to the server into packet sizes in accordance with the size of the PMTU;
    a second proxy deployed within a second computing device detecting whether a first network packet from transmission of repacketized packets from the first proxy is fragmented and transmitting to the first proxy an acknowledgement of the first network packet without a fragment indicator;
    wherein the first proxy determines the first network packet of the repacketized network packets has a round trip time greater than a previous round trip time for networks packets transmitted to the server, and the first proxy increases the size of the PMTU by the predetermined amount responsive to receiving the acknowledgement for the first network packet without a fragmentation indication.

12. The system of claim 11, wherein the first proxy increases the PMTU in response to not receiving an indication of fragmentation from the second proxy within a predetermined time period.

13. The system of claim 11, wherein the first proxy records a sequence number of the first network packet with the round trip time that is greater than the previous round trip time.

14. The system of claim 13, wherein the first proxy determines that the acknowledgement was received for the recorded sequence number.

15. The system of claim 11, wherein the first proxy transmits to the server via the second proxy network packets repacketized in accordance with the size of the PMTU.

16. The system of claim 11, wherein the first proxy receives an indication of fragmentation from the second proxy.

17. The system of claim 16, wherein the first proxy undoes a last increase in the size of the PMTU in response to receiving the indication of the fragmentation from the second proxy.

18. The system of claim 11, wherein the first proxy identifies that the repacketized packets are not prohibited from being fragmented.

19. The system of claim 11, wherein the second proxy receives the repacketized packets transmitted from the first proxy and determines whether fragmentation has occurred.

20. The system of claim 11, wherein the first proxy increases the size of the PMTU by the predetermined amount for each round trip time in which an indication of fragmentation is not received by the first proxy.

* * * * *